United States Patent

Ogawa et al.

[11] Patent Number: 5,524,842
[45] Date of Patent: Jun. 11, 1996

[54] RETRACTOR WITH A CLAMP MECHANISM

[75] Inventors: Kiyoshi Ogawa; Sadanori Ohsumi, both of Kanagawa, Japan

[73] Assignee: NSK Ltd., Tokyo, Japan

[21] Appl. No.: 304,691

[22] Filed: Sep. 12, 1994

[30] Foreign Application Priority Data

Sep. 10, 1993 [JP] Japan .................................. 5-053873 U
Sep. 10, 1993 [JP] Japan .................................. 5-053875 U

[51] Int. Cl.6 .................................................. B60R 22/42
[52] U.S. Cl. ............................................... 242/381.1
[58] Field of Search ............................ 242/381.1, 381.4; 280/805, 806, 807; 297/472, 476, 478

[56] References Cited

U.S. PATENT DOCUMENTS

| 4,422,593 | 12/1983 | Takada . | |
|---|---|---|---|
| 4,949,995 | 8/1990 | Haland et al. | 280/805 |
| 5,029,769 | 7/1991 | Fohl | 242/381.1 |
| 5,029,896 | 7/1991 | Ernst | 242/381.1 X |
| 5,154,368 | 10/1992 | Fujimura et al. . | |
| 5,174,604 | 12/1992 | Numazawa et al. | 280/806 |
| 5,242,213 | 9/1993 | Fohl | 297/472 |
| 5,299,854 | 4/1994 | Fujimura et al. | 297/472 |
| 5,323,977 | 6/1994 | Frei et al. . | |

FOREIGN PATENT DOCUMENTS

| 0556718 | 8/1993 | European Pat. Off. . |
|---|---|---|
| 3233797 | 6/1983 | Germany . |
| 3421837 | 12/1985 | Germany . |
| 3717559 | 12/1988 | Germany . |
| 8915307 | 4/1990 | Germany . |
| 443550 | 4/1992 | Japan . |
| 443551 | 4/1992 | Japan . |

Primary Examiner—John M. Jillions
Attorney, Agent, or Firm—Sughrue, Mion, Zinn, Macpeak & Seas

[57] ABSTRACT

In a retractor with a clamp mechanism for holding a webbing directly in a vehicle emergency, the retractor provides a movable clamp member for holding the webbing between the lower plate and the clamp member, and a guide member for guiding the clamp member to a webbing holding position, in which the clamp member includes a clamp teeth portion for clamping and engaging the webbing with a webbing opposing surface of the clamp member, a plane portion located on an opposite side to the webbing opposing surface, and a rear end side edge provided on a rear end side of the plane portion, and in which the guide member includes a sliding contact surface for sliding contact with the plane portion of the clamp member and a deforming portion deformable substantially in parallel to the webbing opposing surface of the clamp member. A movable wedge-shaped clamp member may be provided with a hold portion including a clamp teeth portion formed in a shape capable of biting into a surface of the webbing and shearable and deformable by a tensile force of a predetermined value or greater, and including a pressure teeth portion capable of applying resistance to the webbing moved in the webbing draw-out direction by a tensile force of a predetermined value or greater.

9 Claims, 12 Drawing Sheets

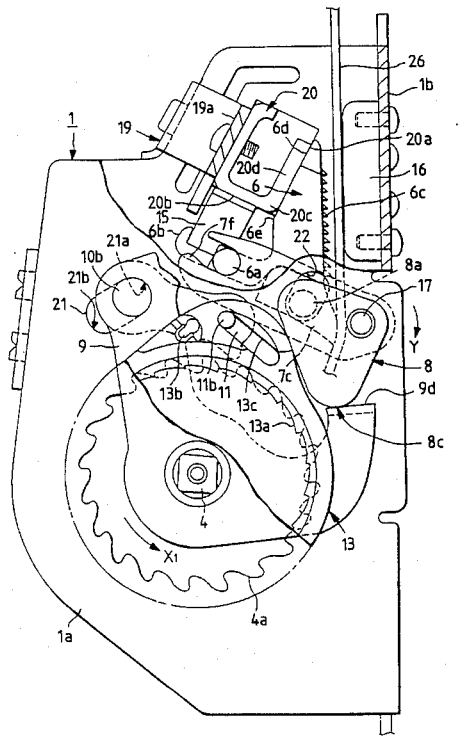

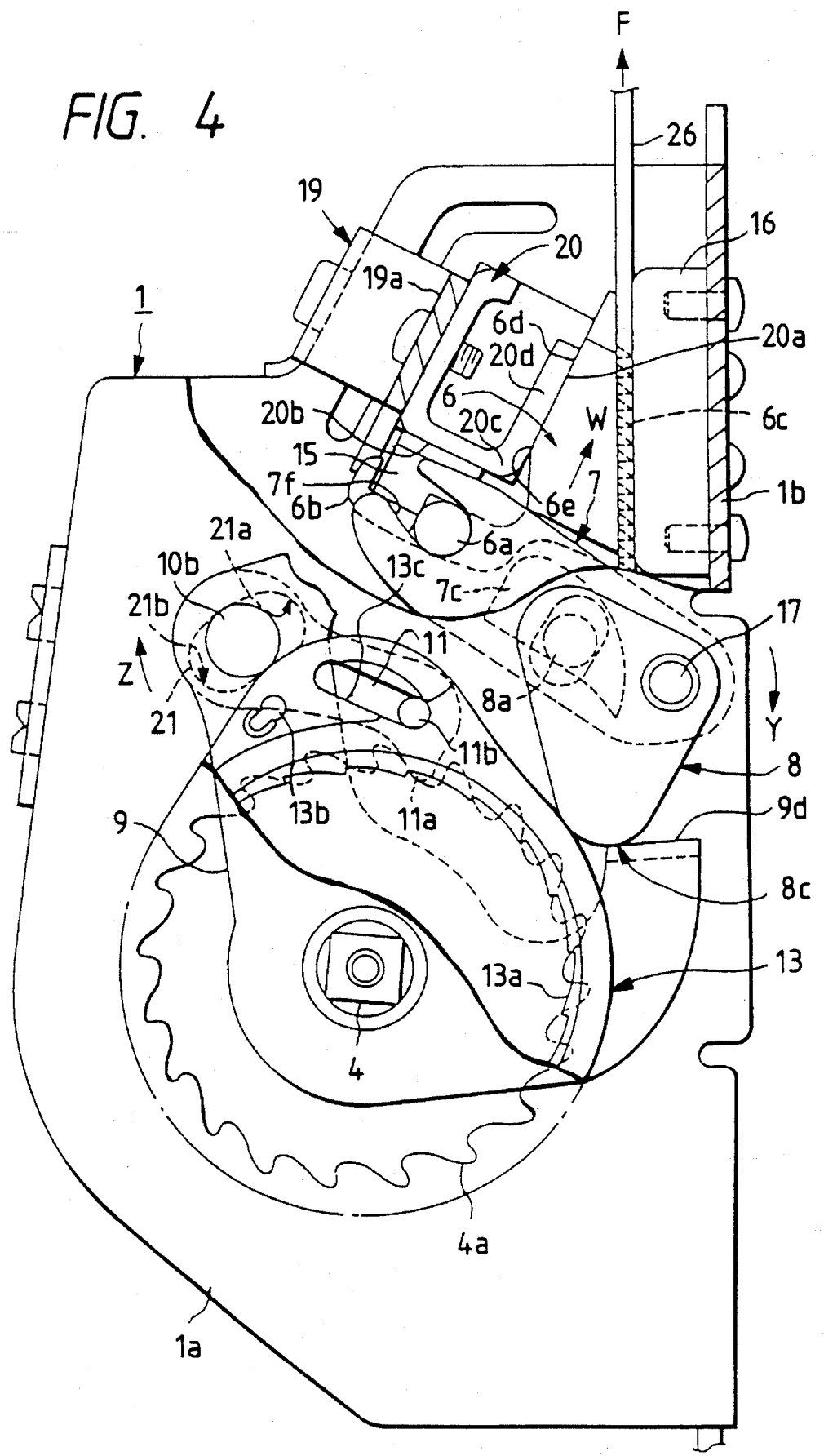

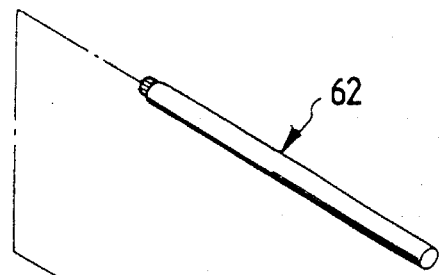
FIG. 9
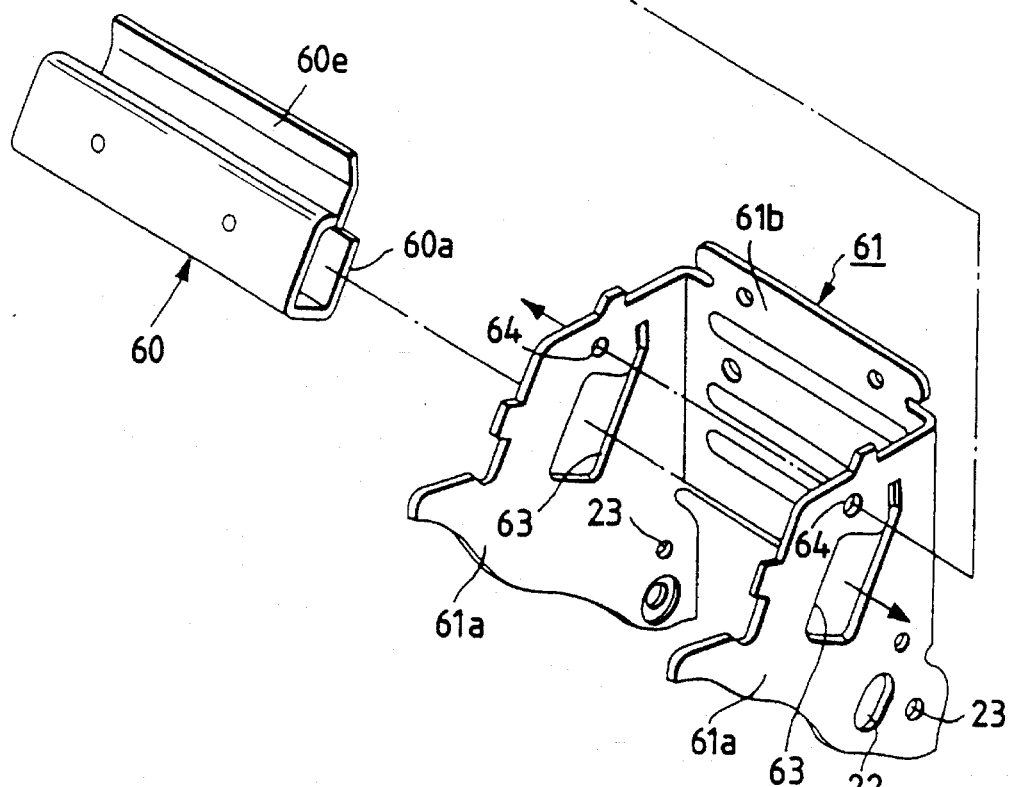
FIG. 11
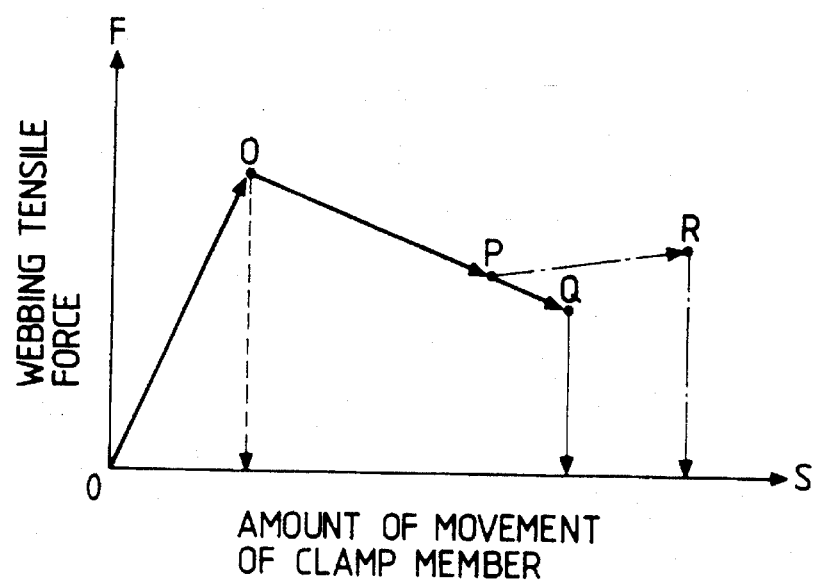

RETRACTOR WITH A CLAMP MECHANISM

BACKGROUND OF THE INVENTION

The present invention relates to a retractor (a winding device) for use in a seat belt device, particularly, to an improved retractor with a clamp mechanism which holds a webbing directly between two parts thereof in a vehicle emergency to minimize the amount of drawing-out of the webbing.

Conventionally, there has been employed a seat belt device which restrains an occupant or the like in a vehicle to protect the occupant against collision shocks. The seat belt device employs a retractor of a type including not only an emergency lock mechanism which, in a vehicle emergency such as a collision or the like, locks the rotation of a winding shaft with a webbing wound thereround in the webbing draw-out direction but also a clamp mechanism which holds the webbing between two parts thereof to prevent the extension of a seat belt, thereby improving the occupant restraining performance thereof in the early stage of the vehicle collision.

However, there is a possibility that a force greater than the break strength of the webbing can be applied to the webbing held by the clamp mechanism in the vehicle emergency such as a collision or the like. That is, if a strong tensile force to draw out the webbing is further applied to the retractor which prevents the extension of the seat belt by the clamp mechanism, then a force to hold the webbing more strongly is collectively applied to the webbing holding portion, so that there is the possibility that the webbing would be broken in the webbing holding portion. Also, if the shock due to the collision is very great, then a sudden deceleration is applied to the body of the occupant, with the result that a load to be applied to the occupant by the seat belt can be increased.

In order to avoid the above problems, for example, a retractor with a clamp disclosed in U.S. Pat. No. 5,154,368, U.S. Pat. No. 5,299,854, Unexamined Japanese Utility Model Publication No. 4-43550 and various other retractors including a clamp mechanism which, if a tensile force of a predetermined force or greater is applied to the webbing, a part of a rotary holding member holding the webbing is deformed a part of a case (a retractor base) or a shaft supporting one end portion of the rotary holding member rotatably is broken to remove the force that holds the webbing have been proposed. That is, in such clamp mechanism, by removing the operation of the clamp mechanism to allow the seat belt to be played out a predetermined amount, a deceleration generated in the body of the occupant is relieved to protect the occupant's body more surely as well as to prevent damage of the webbing.

On the other hand, as a clamp mechanism, unlike the above-mentioned clamp mechanism in which the rotary hold member with one end portion thereof rotatably supported by the retractor base holds the webbing to prevent the extension of the seat belt, there is proposed another clamp mechanism in which a wedge-shaped clamp member is inserted between the sliding contact surface of a guide member fixed to a retractor base and a base back plate to hold a webbing to prevent the extension of a seat belt. However, in the last-mentioned type of clamp mechanism, various clamp removing mechanisms which can be provided in the former type of clamp mechanisms cannot be applied because the parts of the last-mentioned type of clamp mechanism are different from those employed in the former type of clamp mechanisms.

In view of the above circumstances, as a clamp removal mechanism that can be applied to the clamp mechanism using a wedge-shaped clamp member, a clamp removal mechanism is disclosed in U.S. Pat. No. 5,242,213, Unexamined Japanese Utility Model Publication No. 4-43551, and the like.

In the clamp removal mechanism disclosed in U.S. Pat. No. 5,242,213, a belt retracting device (a retractor) and a webbing clamping device (a clamp mechanism) are connected by a connecting device which, simultaneously when reaching a stipulated value of stress, deforms elastically to move apart from the belt retracting device to allow the limited motion of the webbing clamping device. And, if a webbing pulling force of a stipulated load value or more is applied to the webbing clamping device, then the connecting device is broken to thereby release the holding of the webbing by the webbing clamping device.

Also, in the clamp removing mechanism disclosed in Unexamined Japanese Utility Model Publication No. 4-43551, a holding portion (a teeth portion) to be provided on the surface of a holding device opposed to a webbing is arranged such that it can be sheared with a pulling force to be applied to the webbing, and thus, if a pulling force of a predetermined value or greater is applied to the webbing, then the holding portion can be sheared to release the holding of the webbing by the holding device.

However, in a retractor incorporating the clamp removing mechanism disclosed in U.S. Pat. No. 5,242,213, if a webbing pulling force of a predetermined value or greater is given to the webbing clamping device, then the connecting device is broken and the webbing clamping device moves apart from the belt retracting device and a vehicle body space for storing the retractor is inevitably enlarged to allow the movement of the belt retractor, which results in poor vehicle mounting efficiency.

Also, in a retractor incorporating the clamp removing mechanism disclosed in Unexamined Japanese Utility Model Publication No. 4-43551, if a webbing pulling force of a predetermined value or greater is applied to the holding device, then the holding device is sheared to thereby remove the webbing holding force with the result that the webbing tension acting on the webbing is caused to decrease suddenly. At the same time, if the rotation of a winding shaft in the webbing drawing-out direction is locked by an emergency lock mechanism, then the webbing tension is caused to rise suddenly again. Therefore, the webbing tension often increases or decreases to thereby vary greatly the deceleration that acts on the body of the occupant. Also, since the webbing tension falls greatly from the time when the webbing holding force is removed to the time when the webbing holding force rises again, it is difficult to absorb efficiently the kinetic energy that is produced by the occupant's body in a collision.

SUMMARY OF THE INVENTION

In view of the above-mentioned conventional circumstances, the present invention aims at eliminating the drawbacks found in the conventional retractors. Accordingly, it is an object of the present invention to provide a retractor including an improved clamp removal mechanism which provides an excellent vehicle mounting performance and, in a vehicle collision, can absorb efficiently the kinetic energy produced in the body of the occupant.

In attaining the above object, according to the present invention, there is provided a retractor including a clamp mechanism for holding a webbing directly in a vehicle emergency, the retractor providing a retractor base, a lower plate fixed to the retractor base, a movable clamp member for holding a webbing between the lower plate and the clamp member, and a guide member for guiding the clamp member to a webbing holding position, in which the clamp member includes a clamp teeth portion for clamping and engaging the webbing with a webbing opposing surface of the clamp member, a plane portion located on an opposite side to the webbing opposing surface, and a rear end side edge provided on a rear end side of the plane portion, and in which the guide member includes a sliding contact surface for sliding contact with the plane portion of the clamp member and a deforming portion deformable substantially in parallel to the webbing opposing surface of the clamp member.

According to another aspect of the present invention, there is provided a retractor including a clamp mechanism for holding a webbing directly in a vehicle emergency, the retractor providing a retractor base, a winding shaft supported rotatably on the retractor base for winding a webbing thereround, a ratchet plate mounted on the winding shaft, a pawl member engageable with the ratchet plate for locking the rotation of the winding shaft in a webbing draw-out direction, a lower plate fixed to the retractor base, and a movable wedge-shaped clamp member for holding the webbing between the lower plate and the clamp member, in which the clamp member includes a hold portion for clamping and engaging the webbing, and the hold portion including a clamp teeth portion formed in a shape capable of biting into a surface of the webbing and shearable and deformable by a tensile force of a predetermined value or greater, and the clamp member includes a pressure teeth portion capable of applying resistance to the webbing moved in the webbing draw-out direction by a tensile force of a predetermined value or greater.

According to the structure of the present invention, if a tensile force of a predetermined value or greater is applied to the webbing in a vehicle emergency, then a load of a predetermined value or greater is given to the guide member as well through the rear end side edge of the clamp member, so that the clamp member is moved in the webbing draw-out direction while it is changing the deforming portion of the guide member in such a manner that the sliding contact surface is substantially parallel to the webbing opposing surface of the clamp member.

When the deforming portion of the guide member is deformed to such an extent that the sliding contact surface becomes substantially parallel to the webbing opposing surface of the clamp member, then the clamp member becomes free to move in the webbing draw-out direction to thereby remove the clamp mechanism. That is, when the sliding contact surface becomes substantially parallel to the webbing opposing surface of the clamp member, then a resisting force given by the sliding contact surface for restricting the movement of the clamp member in the webbing draw-out direction does no act on the clamp member, so that the clamp member together with the webbing is free to move in the webbing draw-out direction and thus the webbing holding force is removed.

Due to this, the kinetic energy of the occupant is absorbed effectively in a process where the deforming portion is deformed, thereby being able to prevent the webbing tensile force from dropping suddenly when the clamping condition is removed.

Also, since the clamp mechanism is removed simply when the deforming portion of the guide member is deformed such that the sliding contact surface becomes substantially parallel to the webbing opposing surface of the clamp member, there is eliminated the need to enlarge the vehicle space for storing the present retractor.

Further, according to the structure of another aspect of the present invention, if a tensile force of a predetermined value or more is applied to the webbing held by the clamp member in a vehicle emergency, then the clamp teeth portion is in part sheared or deformed to thereby remove the webbing holding force of the holding portion by the clamp teeth portion.

As a result of this, the webbing is moved in the webbing draw-out direction. However, since a pressure by the pressure teeth portion of the hold portion and a slide resistance between the webbing and the remaining portion of the clamp teeth are being applied to the webbing, the webbing holding force by the clamp member will not be removed.

Therefore, the kinetic energy of the occupant can be consumed effectively by the resistance given by the pressure teeth portion and the sliding resistance produced between the webbing and the remaining portion of the clamp teeth, which can prevent the sudden drop of the webbing tensile force when the clamping condition is removed.

Also, by changing the distribution of the clamp teeth portion and pressure teeth portion in the holding portion or the shapes of the teeth in the hold portion, the clamp removing load can be controlled easily.

BRIEF DESCRIPTION OF THE DRAWINGS

In the accompanying drawings:

FIG. 4 is a partially broken side view of a clamp mechanism employed in the retractor shown in FIG. 1, explaining the operation thereof;

FIG. 9 is an enlarged perspective view of the main portions of a retractor including a clamp mechanism according to a third embodiment of the present invention;

FIG. 11 is a graphical representation of a relationship between a webbing tensile force F and an amount S of movement of a clamp member in the webbing draw-out direction in a clamp mechanism;

DETAILED DESCRIPTION OF THE PREFERRED EMBODIMENTS

Now, description will be given hereinbelow in detail of the embodiments of a retractor including a clamp mechanism according to the present invention with reference to the accompanying drawings.

Figure 1:
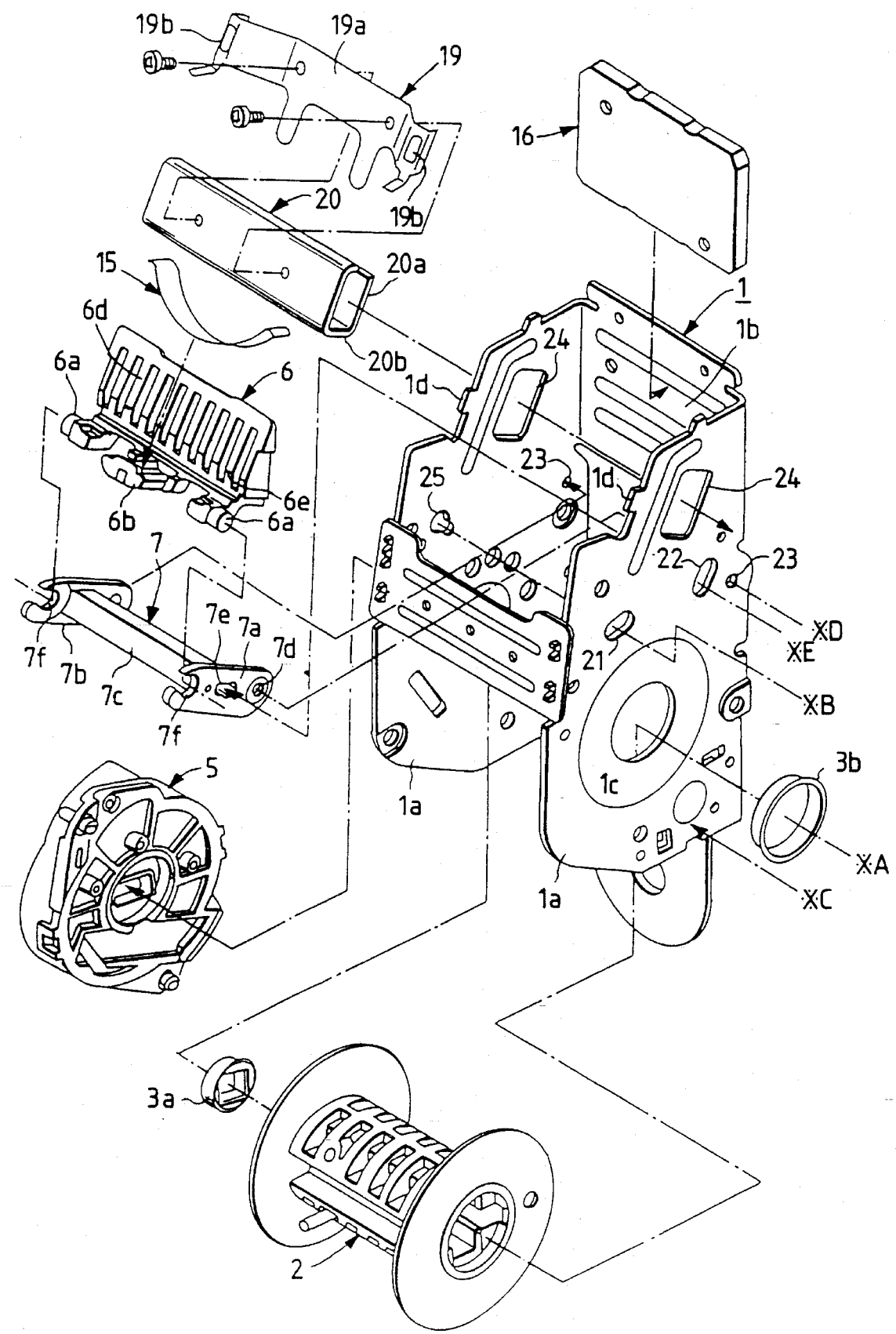
FIG. 1 is an exploded perspective view of part of a retractor including a clamp mechanism according to a first embodiment of the present invention.
Figure 2:
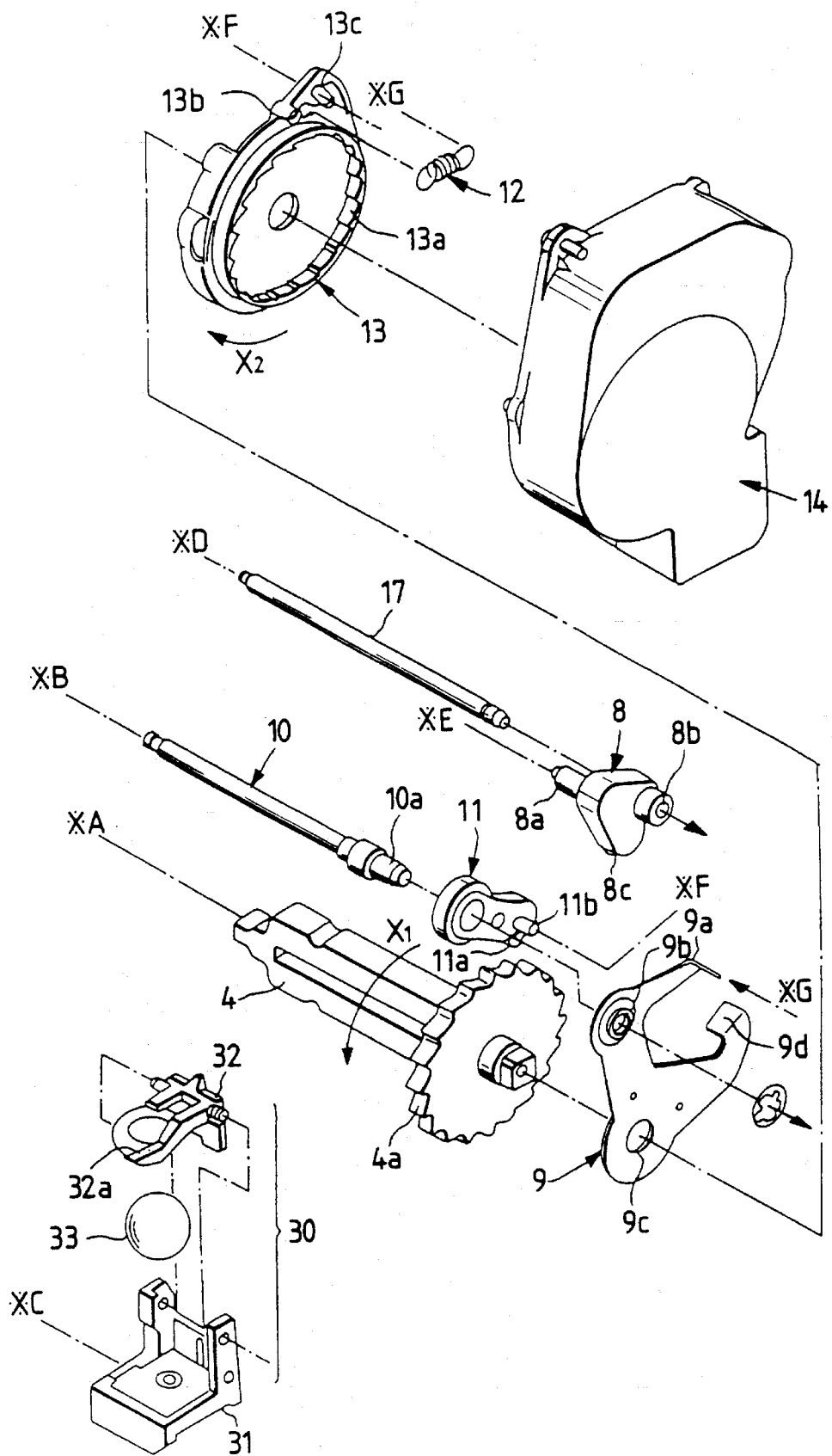
FIG. 2 is an exploded perspective view of the remaining portions of the retractor including a clamp mechanism shown in FIG. 1.

FIGS. 1 and 2 respectively show an exploded perspective view of a retractor including a clamp mechanism according to a first embodiment of the present invention. In FIGS. 1 and 2, a retractor base 1, for the most part, has a U-shaped section, includes two mutually opposing side plates 1a, and also includes two mutually opposing through holes 1c which are respectively formed in the two side plates 1a. A winding shaft 4, on which there is fixed a bobbin 2 for winding a webbing therearound, is rotatably journaled through the two through holes 1c by two right and left plastic bushes 3a, 3b. A well known tension reducer 5 is disposed on one end portion of the winding shaft 4 and the winding shaft 4 is always energized in a direction to wind or take-up the webbing.

On the other end portion of the winding shaft 4 there is disposed an emergency lock mechanism which is used to prevent the webbing from being drawn out in an emergency. The emergency lock mechanism includes a ratchet plate 4a consisting of a ratchet wheel fixed to the other end portion of the winding shaft 4, and part of the winding shaft 4 is projected outwardly of the ratchet plate 4a. A tension plate 9, through which the winding shaft 4 is inserted via a through hole 9c formed therein, and a ratchet cup 13 consisting of a ratchet member with inner teeth 13a are loosely fitted over the outwardly projecting portion of the winding shaft 4. A return spring 12 is mounted on a spring hanger 13b provided in the ratchet cup 13 and on a spring hanger 9a provided in the tension plate 9, and an energization force is given to the ratchet cup 13 so that the ratchet cup 13 is energized so as to rotate in a direction of an arrow $X_2$. And in the portion of the winding shaft 4 extending outwardly of the ratchet cup 13, there are disposed a lock member 28 and a flange 27 cooperating to form a lock device, and a known inertia member (not shown). In an emergency such as a collision or the like, if tension is applied to the webbing so that the winding shaft 4 is given a shocking rotational force of a predetermined value or more in a webbing draw-out direction (a direction of an arrow of $X_1$), then the ratchet cup 13 is rotated in the arrow $X_1$ direction against the energization force of the return spring 12.

Also, a pawl 11 consisting of a ratch member, which is engageable with the ratchet plate 4a to thereby prevent the ratch plate 4a from rotating in the webbing draw-out direction (the arrow $X_1$ direction), is supported through a pawl pin 10 outwardly of the side plate 1a such that it can be engaged with or disengaged from the ratchet plate 4a. The pawl pin 10 is mounted such that it is inserted through a through hole 25 and an elongated hole 21 respectively formed in the two mutually opposing side plates 1a, and the pawl pin 10 includes an outer end side shaft portion 10a which is swingable along the elongated hole 21 with the engaging portion thereof with the through hole 25 as the center thereof. Further, a through hole 9b formed in a first swinging portion of the tension plate 9 is fitted over the outer end side shaft portion 10a. Accordingly, the pawl 11 is able to shift the center of swinging rotation thereof along the elongated hole 21. And the pawl 11 includes a pawl guide projection 11b which is inserted into a pawl guide hole 13c formed projectingly in the outer peripheral portion of the ratchet cup 13.

Further, a sensor case 31 forming a vehicle body acceleration sensing device 30 is fixedly secured to the lower portions of the side plates 1a and, in the hollow portion of the sensor case 31, there are mounted a ball weight 33 serving as a sensor as well as a swingable sensor arm 32 having a securing projection 32a. And a sensor cover 14 is disposed on the outside of the side plate 1a covering the emergency lock mechanism.

Inwardly and upwardly of the retractor base 1 to be covered with a dust cover (not shown), there is disposed a clamp mechanism which holds the webbing directly to thereby prevent the webbing from being drawn out.

Figure 3:
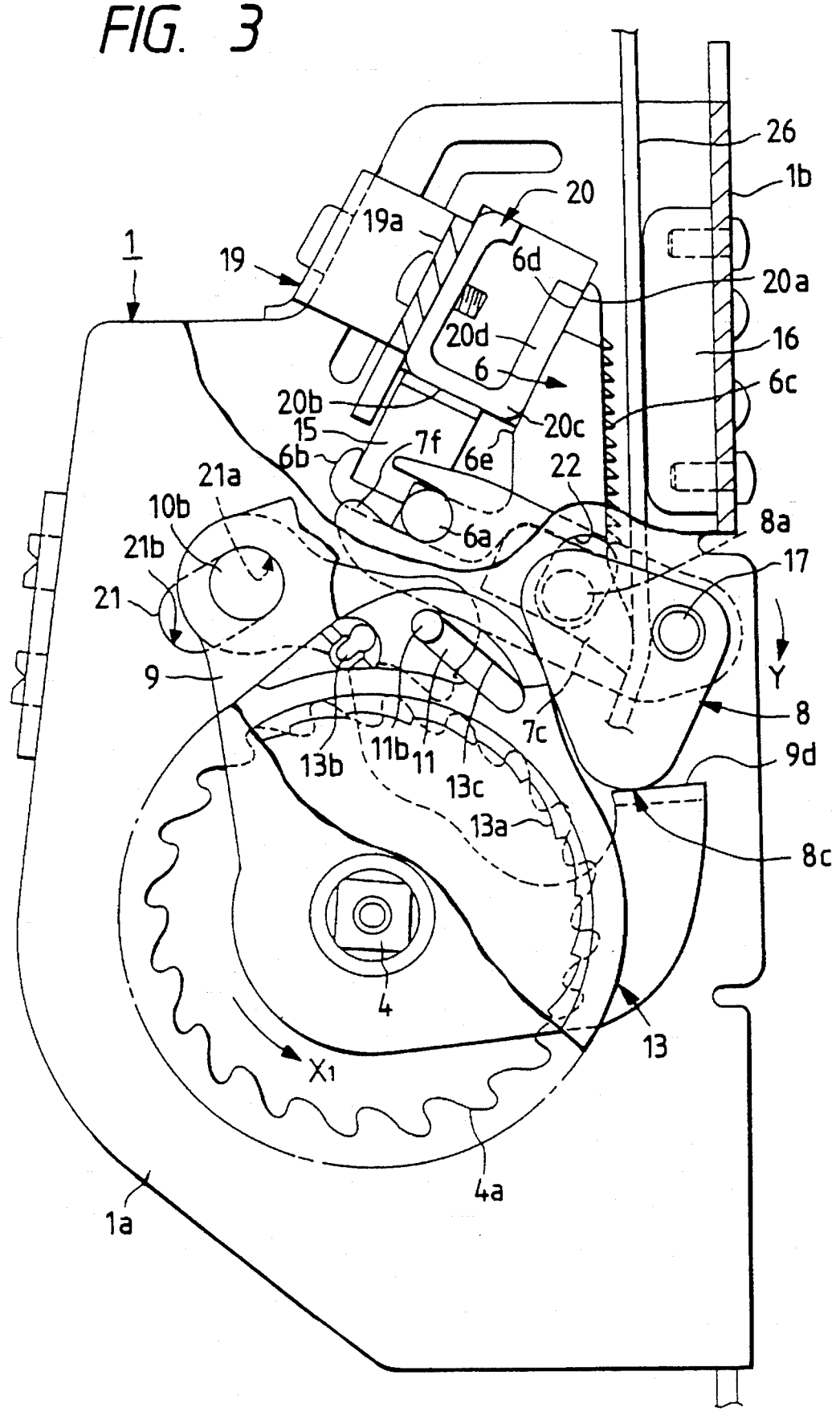
FIG. 3 is a partially broken side view of a clamp mechanism employed in the retractor shown in FIG. 1, explaining the operation thereof.

Describing this with reference to a partially broken side view shown in FIG. 3 together with FIGS. 1 and 2, the clamp mechanism includes a clamp 6 consisting of a wedge-shaped clamp member including a clamp teeth portion 6c, which is formed on a holding portion in a webbing opposing surface of the clamp member for clamping and engaging a webbing 26, and an upper stay 19 holding an upper plate 20 which is a guide member capable of sliding contact with the plane portion 6d of the clamp 6 located on the opposite side thereof to the webbing opposing surface with the clamp teeth portion 6c formed thereon.

The upper stay 19 is arranged such that, if mounting holes 19b formed in the upper stay 19 are respectively fitted with projections 1d provided in the side plates 1a and the upper plate 20 is fixed to a mounting plate 19a of the upper stay 19 by use of a screw, then the upper stay 19 can restrict the movement of the upper plate 20 in the longitudinal direction thereof.

The upper plate 20 includes a sliding contact surface 20a for sliding contact with the plane portion 6d of the clamp 6, and also the upper plate 20 is a rigid body which is provided with desired rigidity. Here, the sliding contact surface 20a is provided in the outer side surface of a cantilever piece 20d. To form the cantilever piece 20d, one corner portion of a hollow member having a rectangular section may be cut in the longitudinal direction thereof and then the thus cut portion may be projected out with the leading end thereof as a free end. Further, the corner portion of the cantilever piece 20d located at the base end side thereof is formed as a deforming portion 20c of the upper plate 20 which can be deformed so that the sliding contact 20a can be substantially parallel to the webbing opposing surface of the clamp 6. That is, if a load of a predetermined value or greater is applied to the free end side of the cantilever piece 20d, then the cantilever piece 20d can be folded at and from the deforming portion 20c.

After the two end portions of the upper plate 20 are fitted into through holes 24 respectively formed in the mutually opposing side plates 1a, the upper plate 20 is fixed to the mounting plate 19a of the upper stay 19, whereby the upper plate 20 has such a predetermined angle of inclination that the sliding contact surface 20a of the upper plate 20 for guiding the clamp 6 to the webbing clamping and engaging position is located near the upper side portion of a lower plate 16 fixed to a base back plate 1b of the retractor base 1.

Since the clamp teeth portion 6c of the clamp 6, in which the narrow leading end portion thereof is situated upside and the plane portion 6d thereof is positioned in surface contact with the sliding contact surface 20a of the upper plate 20, is always disposed in parallel to the surface of the webbing 26 to be held thereby, the clamp 6 slidable along the sliding contact surface 20a of the upper plate 20 is able to clamp and engage the webbing 26 uniformly. Also, because the rear portion of the clamp 6 located opposite to the webbing opposing surface thereof is formed in such a manner that it has a plane portion substantially parallel to the webbing opposing surface of the clamp 6, there is formed a rear end side edge 6e at the rear end side of the plane portion 6d. Further, between an engaging portion 6b projected at the rear end side of the clamp 6 and the rear end surface 20b of the upper plate 20 there is interposed a return spring 15 which energizes the clamp 6 in a direction in which it is not engaged with the webbing 26.

Below of the clamp 6, there is disposed a clamp lever 7 which is used to restrict the movement of the clamp 6 being energized by the return spring 15. The clamp lever 7 cooperates with an outer plate 8, which is located inside the side plate 1a and is engageable with the tension plate 9, in forming a lever member serving as a linking device which is used to move the clamp 6 in the webbing holding direction in linking with the emergency lock mechanism.

The clamp lever 7 includes a pair of plate-like members 7a, 7b respectively having notches 7f engageable with axles 6a projectingly provided on the side wall of the clamp 6, and a connecting portion 7c connected between these two plate-like members 7a, 7b for abutment against the rear end wall of the clamp 6, while the clamp lever 7 is rotatably journaled when a lever pin 17 inserted into through holes 23 respectively formed in the mutually opposing side plates 1a is fitted into two holes 7d respectively formed in the plate-like members 7a, 7b. The outer plate 8 is journaled to be rotatable along the side plate 1a while one end portion of the lever pin 17 extending through the through holes 23 is further inserted through a through hole 8b formed in the outer plate 8. Further, the outer plate 8 includes an inward shaft portion 8a, which projects inwardly and extends through an elongated hole 22 formed in the side plate 1a for engagement with an engaging hole 7e formed in the plate-like member 7a, and a contact portion 8c engageable with an engaging portion 9d formed in a second swinging end portion provided in the tension plate 9.

The clamp lever 7 is prevented from rotating downwardly by the inward shaft portion 8a to be secured by the elongated hole 22, whereby the clamp lever 7 can restrict the movement of the clamp 6 against the energization force of the return spring 15. That is, the axles 6a of the clamp 6 are respectively supported by the notches 7f formed on the swinging ends sides of the plate-like members 7a, 7b, and the rear end wall of the clamp 6 is supported by the connecting portion 7c, so that the clamp teeth portion 6c is held at a position where the clamp teeth portion 6c is not engageable with the webbing 26. Therefore, if the outer plate 8 is rotated upwardly, then the clamp lever 7 is rotated upwardly through the inward shaft portion 8a. The upwardly rotated clamp lever 7 presses against the axles 6a of the clamp 6 against the energization force of the return spring 15 to thereby slide the plane portion 6d along the sliding contact surface 20a of the upper plate 20 as well as to move the clamp in a direction in which the clamp 6 is engageable with the webbing 26. During this operation, there is no possibility that the elongated hole 22 can interfere with the inward shaft portion 8a.

Further, the engaging portion 9d provided in the second swinging end portion of the tension plate 9 is pressurized downwardly in FIGS. 2 and 3 by the outer plate 8 to which is applied an energization force of the return spring 15 greater than the energization force of the return spring 12, so that the tension plate 9 is rotationally energized in a direction of an arrow $X_2$. The pawl pin 10 is energized in the webbing winding direction at the side of the back plate end face 21a of the elongated hole 21.

Therefore, the lever member including the clamp lever 7 and outer plate 8 and the tension plate 9 cooperate to form a control device which moves the clamp 6 in the webbing holding direction and positions the clamp 6 at a first position to be able to prevent the draw-out of the webbing 26 and at a second position to allow the draw-out of the webbing 26.

Next, description will be given below of the operation of the above-mentioned retractor with a clamp mechanism.

Figure 6:
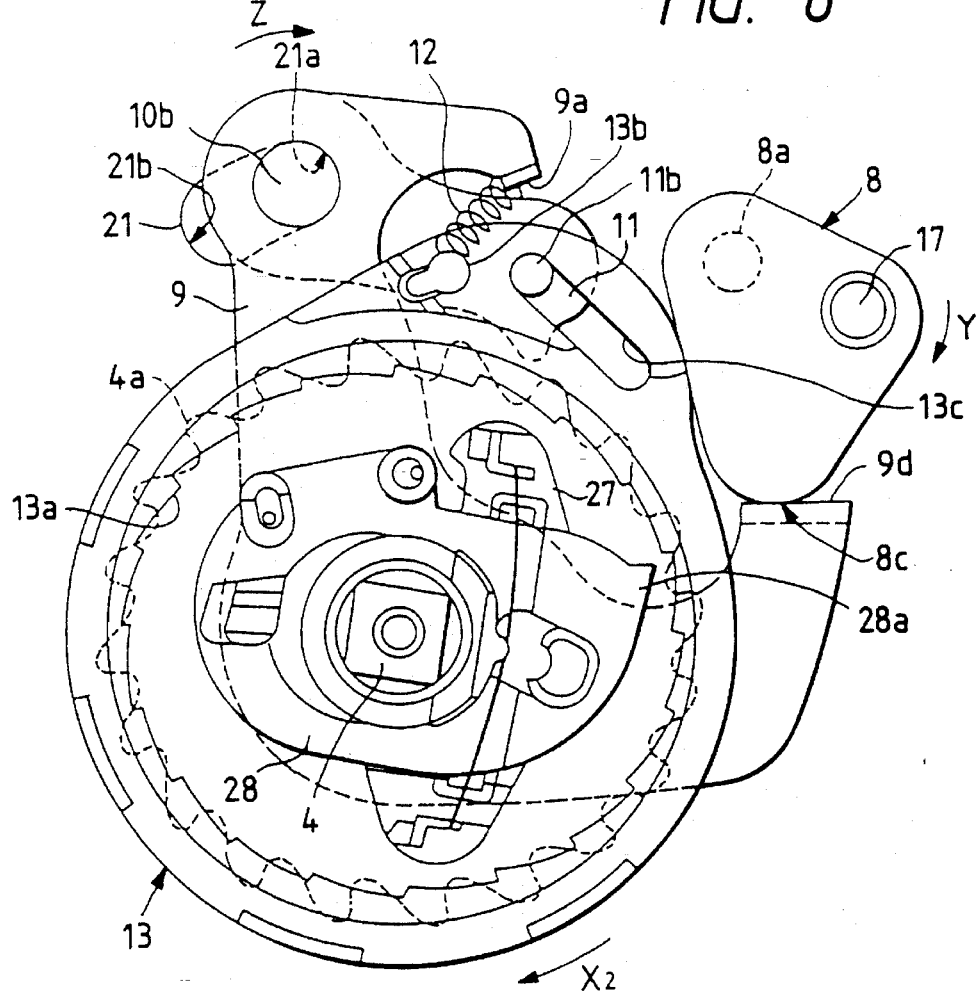
FIG. 6 is an enlarged view of an emergency lock mechanism employed in the retractor including a clamp mechanism shown in FIG. 1.

At first, in normal use, as shown in FIG. 3, the inward shaft portion 8a of the outer plate 8 engageable with the engaging hole 7e of the clamp lever 7 is positioned at the lower end of the elongated hole 22 due to the energization force of the return spring 15, while the clamp 6 is energized by the energization force of the return spring 15 in a direction in which it is not engageable with the webbing 26. Also, as shown in FIG. 6, the ratchet cup 13 is energized in the arrow $X_2$ direction by the energization force of the return spring 12 mounted on the spring hanger 13b and on the spring hanger 9a of the tension plate 9, and the pawl 11 with the pawl guide projection 11b engageable with the pawl guide hole 13c is energized in the non-engageable direction with the ratchet plate 4a, so that the webbing 26 can be drawn out freely.

Accordingly, in an emergency such as a collision or the like, if tension is applied onto the webbing 26 and thus a shocking rotational force of a value or more in the webbing draw-out direction (arrow $X_1$ direction) is applied onto the winding shaft 4, then an inertia member (not shown) receives a force of inertia to generate a rotation delay in the rotation of the winding shaft 4 in the webbing draw-out direction. Responsive to this, the lock device is operated to bring the engaging portion 28a of the lock member 28 into engagement with the internal teeth 13a of the ratchet cup 13, so that the rotational force of a flange 27 is transmitted to the ratchet cup 13 to rotate the ratchet cup 13 in the arrow $X_1$ direction against the energization force of the return spring 12, as shown in FIG. 4. And the pawl guide hole 13c in engagement with the pawl guide projection 11b rotates the pawl 11 through the pawl guide projection 11b in a direction of an arrow Z to thereby bring the engaging portion 11a into engagement with the ratchet plate 4a.

With the engaging portion 11a of the pawl 11 in engagement with the ratchet plate 4a, if the winding shaft 4 is further rotated in the arrow $X_1$ direction, then the pawl pin 10 journaling the pawl 11 moves from the back plate side end face 21a of the elongated hole 21 toward the front side end face 21b thereof against the energization force of the return spring 15 applied to the pawl pin 10 through the tension plate 9, so that the tension plate 9 is rotated in the arrow $X_1$ direction. As a result of this, the engaging portion 9d of the tension plate 9 rotates the outer plate 8 through the contact portion 8c of the outer plate 8 in a direction of an arrow Y and, therefore, the clamp lever 7 is also rotated in the arrow Y direction through the inward shaft portion 8a over which the elongated hole 22 is fitted.

Then, the clamp 6, which is supported by the notch 7f formed on the swinging end side of the clamp lever 7, is moved at once upwardly along the sliding contact surface 20a of the upper plate 20. Since the sliding contact surface 20a is inclined in such a manner that the upper portion thereof comes close to the lower plate 16, the wedge-shaped clamp 6 which has been slid upwardly against the energization force of the return spring 15 is moved in the webbing holding direction (in a direction of an arrow W) and bites between the sliding contact surface 20a and lower plate 16.

Here, because the rear end side edge 6e of the clamp 6 is situated nearer at the free end side of the cantilever piece 20d than the deforming portion 20c, a force to fold the cantilever piece 20d inwardly of the upper plate 20 is applied onto the deforming portion 20c. However, when a tensile force applied to the webbing 26 is smaller than a predetermined tensile force and also when a load applied to the cantilever piece 20d by the clamp 6 is smaller than a predetermined load, then the webbing 26 is held between the clamp 6 and lower plate 16 and is thus prevented from being drawn out because the upper plate 20 has a sufficient rigidity that can prevent the deforming portion 20c from deforming.

The movement of the pawl pin 10 journaling the pawl 11 is stopped when the pawl pin 10 is abutted against the front side end face 21b of the elongated hole 21 to thereby prevent the rotation of the winding shaft 4 in the arrow $X_1$ direction. The contacting timing of the pawl pin 10 with the front side end face 21b is matched to a timing just after the clamp teeth portion 6c has stuck into the webbing 26 completely. This operation timing of the clamp 6 and pawl 11 can be changed arbitrarily by changing the shapes of the contact portion 8c and elongated hole 21 according to cases respectively.

Also, when a vehicle receives a speed change of a predetermined level or greater in an emergency as well, the vehicle body acceleration sensing device 30 operates the lock device to thereby operate the clamp mechanism and emergency lock mechanism in the above-mentioned manner.

If the tension applied to the webbing 26 is removed, then the force to hold the clamp 6 in the holding direction does not exist any longer and thus the clamp 6 is energized by the energization force of the return spring 15 in a direction where it is not engageable with the webbing 26, thereby removing the clamp mechanism. At the same time, the tension plate 9 is also rotated in the removing direction (in a direction of an arrow $X_2$) and the clamp 6 and tension plate 9 return to their respective initial positions. If the webbing 26 is further wound, then the pawl 11 is rotated in the opposite direction to the arrow Z direction, thereby removing the locking between the ratch plate 4a and engaging portion 11a. If the webbing 26 is still further wound, then the engagement between the engaging portion 28a of the lock member 28 and the internal teeth 13a of the ratchet cup 13 is removed and thus the ratchet cup 13 is rotated by the energization force of the return spring 12 in the arrow $X_2$ direction and is thus returned to its original position, so that the webbing 26 can be drawn out freely.

However, in the above-mentioned clamp condition, if the shocks in a collision becomes excessively large and the tensile force F of the webbing 26 is further increased, then the clamp 6 tries to move in the arrow W direction further, which increases also the propping force (resisting force) of the clamp 6 against the lower plate 16 and cantilever piece 20d.

Figure 5A:
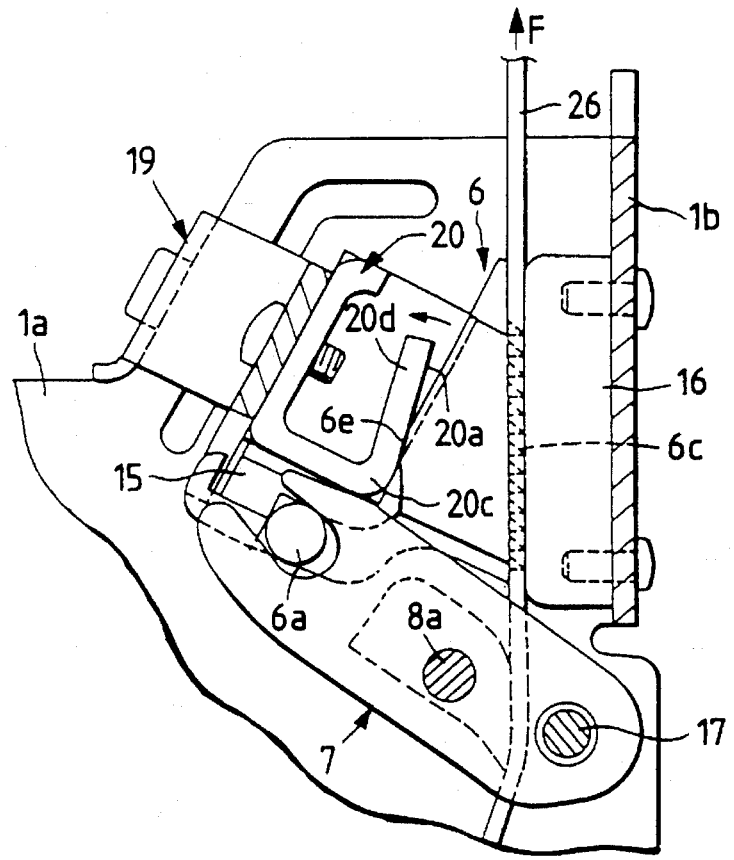
FIGS. 5(a) and 5(b) are enlarged side views of the main portions of the clamp mechanism shown in FIG. 4, explaining the operation thereof.

Accordingly, a tensile force F of a predetermined value or greater is applied onto the webbing 26 and thus the rear end side edge 6e of the clamp 6 is folds the cantilever piece 20d inwardly of the upper plate 20, so that a force acting on the deforming portion 20c also provides a load of a predetermined value or greater. Therefore, as shown in FIG. 5(a), the clamp 6 moves in the webbing draw-out direction while it is deforming the deforming portion 20c such that the sliding contact surface 20a of the upper plate 20 is substantially parallel to the webbing opposing surface of the clamp 6.

Figure 5B:
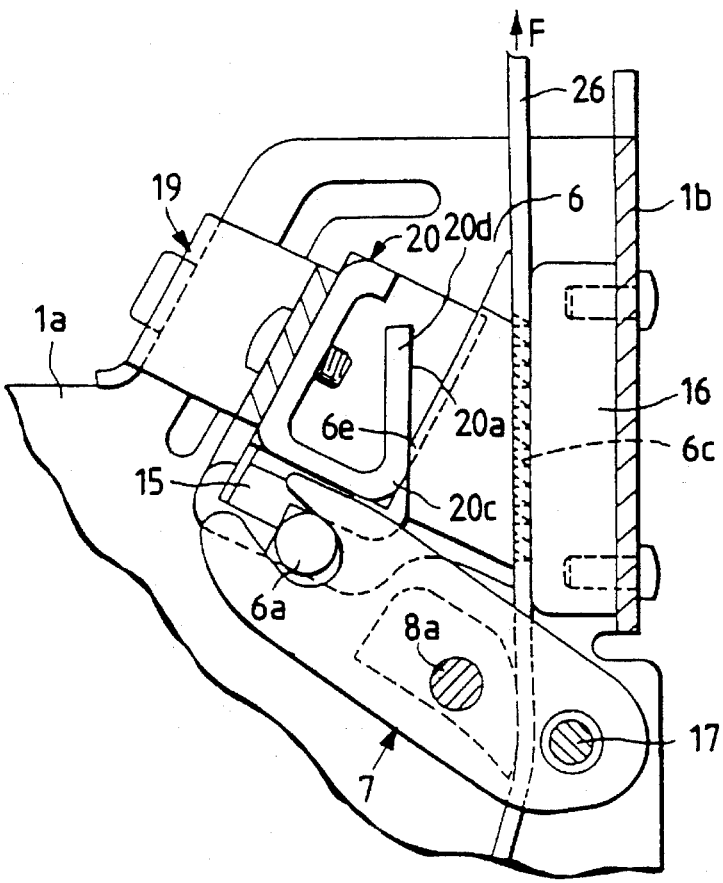

As shown in FIG. 5(b), if the deforming portion 20c of the upper plate 20 is deformed until the sliding contact surface 20a thereof becomes substantially parallel to the webbing opposing surface of the clamp 6, then the clamp 6 is free to move in the webbing draw-out direction to thereby remove the clamp mechanism. That is, if the sliding contact surface 20a is substantially parallel to the webbing opposing surface of the clamp 6, then the clamp 6 is free from the resisting force of the sliding contact surface 20a to restrict the movement of the clamp 6 in the webbing draw-out direction, and thus the clamp 6 together with the webbing 26 is free to move in the webbing draw-out direction to thereby remove the webbing holding force, which prevents the webbing 26 from being broken in the holding portion thereof. Here, it should be noted that, even in a condition that the webbing holding force by the clamp mechanism is removed, the webbing 26 is still prevented from being drawn out by the emergency lock mechanism through the winding shaft 4.

The deforming resistance that is produced when the deforming portion 20c is deformed allows the effective consumption of the kinetic energy of an occupant produced in a vehicle collision through the webbing 26 to thereby prevent a sudden drop in the webbing tension when the clamp is removed. That is, as can be seen clearly from a graphical representation in FIG. 11 showing a relationship between a webbing tension F occurring in the webbing clamped by the clamp mechanism and a clamp movement amount S of the clamp in the webbing draw-out direction, the webbing tension F, which is shown by a solid line in FIG. 11 and acts on the webbing 26 when the clamp removal mechanism according to the first embodiment of the present invention is in operation, decreases gradually according to a predetermined range of clamp movement amount S from a point 0 (a state shown in FIG. 5(a)) where the removal of the webbing holding starts to a point Q (a state shown in FIG. 5(b)) where the webbing holding is removed completely, and thus the webbing tensile force F will not be removed suddenly as in the conventional clamp removal mechanism (if a tensile force of a predetermined value or greater is given to the webbing, then the teeth portion thereof is sheared) shown by a broken line in FIG. 11.

Therefore, according to the first embodiment of the present invention, while the webbing is being clamped, the kinetic energy produced by the body of the occupant due to the vehicle collision can be absorbed efficiently and, after the webbing clamping is removed, the emergency lock mechanism locks the rotation of the winding shaft 4 in the webbing draw-out direction to thereby prevent a big change in deceleration acting on the body of the occupant when the webbing tension increases again. That is, the retractor according to the first embodiment of the present invention is able to perform a very effective occupant protection function.

Also, the retractor according to the first embodiment of the present invention allows the removal of the clamp mechanism simply by deforming the deforming portion 20c of the upper plate 20 in such a manner that the sliding contact surface 20a of the upper plate 20 is substantially parallel to the webbing opposing surface of the clamp 6. This eliminates the need to expand a vehicle space for storing the present retractor, that is, the present retractor can be mounted on a vehicle very simply and compactly.

Figure 7:
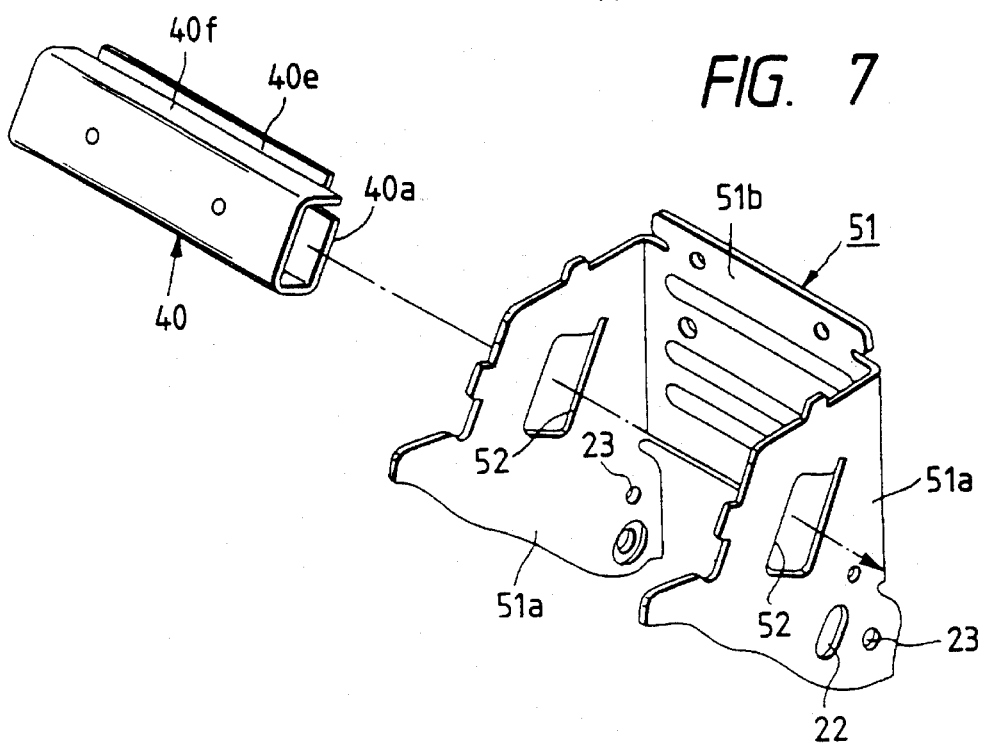
FIG. 7 is an enlarged perspective view of the main portions of a retractor including a clamp mechanism according to a second embodiment of the present invention.

Now, FIG. 7 is an enlarged perspective view of the main portions of a retractor with a clamp mechanism according to a second embodiment of the present invention. In the second embodiment, similar parts to those in the abovementioned first embodiment one used and the detailed description thereof is omitted here.

The retractor with a clamp mechanism shown in FIG. 7 includes an upper plate 40 which is a guide member forming the clamp mechanism of the present retractor with a clamp mechanism. The upper plate 40 is a rigid body provided with desired rigidity and includes a main cantilever piece 40d which is formed by cutting one corner portion of a hollow member having a rectangular section in the longitudinal direction thereof and projecting it with the leading end thereof as a free end, an extension tongue portion 40e provided at and extended from the leading end of the main cantilever piece 40d, and a sliding contact surface 40a provided on the outer surface of the upper plate 40 for sliding contact with the plane portion 6d of the clamp 6.

Also, a corner portion of the main cantilever piece 40d situated at the base end side thereof is used as a first deforming portion 40c of the upper plate 40 which can be deformed in such a manner that the sliding contact surface 40a of the upper plate 40 is substantially parallel to the webbing opposing surface of the clamp 6. If a predetermined or greater load is applied to the free end side of the main cantilever piece 40d, then the main cantilever piece 40d is folded at and from the first deforming portion 40c. Further, a corner portion of a sub-cantilever piece 40f, which is disposed opposed to the extension tongue portion 40e, situated at the base end side thereof is used as a second deforming portion 40g which can be deformed after the first deforming portion 40c.

The upper plate 40 is fixed to a mounting plate 19a of the upper stay 19 after the two end portions thereof are fitted into through openings 52 respectively formed in two mutually opposing side plates 51a, whereby the sliding contact surface 40a of the upper plate 40 for guiding the clamp 6 to a webbing clamping and engaging position has a predetermined angle of inclination which allows the upper portion of the sliding contact surface 40a to be close to the lower plate 16 fixed to a base back plate 51b of a retractor base 51.

Next, description will be given below of the operation of a clamp mechanism employed in the second embodiment of the present invention.

Figure 8A:
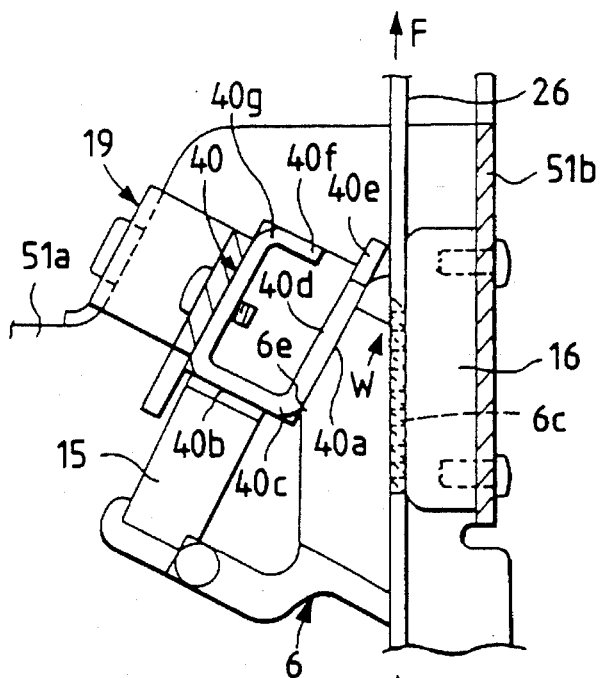
FIGS. 8(a), 8(b) and 8(c) are enlarged side views of the main portions of a clamp mechanism employed in the second embodiment, explaining the operation thereof.

At first, if tension is applied onto the webbing 26 in an emergency such as a collision or the like and thus a shocking rotational force of a predetermined value or greater in the webbing draw-out direction is applied onto the winding shaft 4, then as shown in FIG. 8(a), the wedge-shaped clamp 6 is immediately moved upwardly along the sliding contact surface 40a of the upper plate 40 by the clamp lever 7 and slides upwardly against the energization force of the return spring 15, and then the clamp 6 is moved in a webbing holding direction (a direction of an arrow W) and bites between the sliding contact surface 40a and lower plate 16.

Figure 8B:
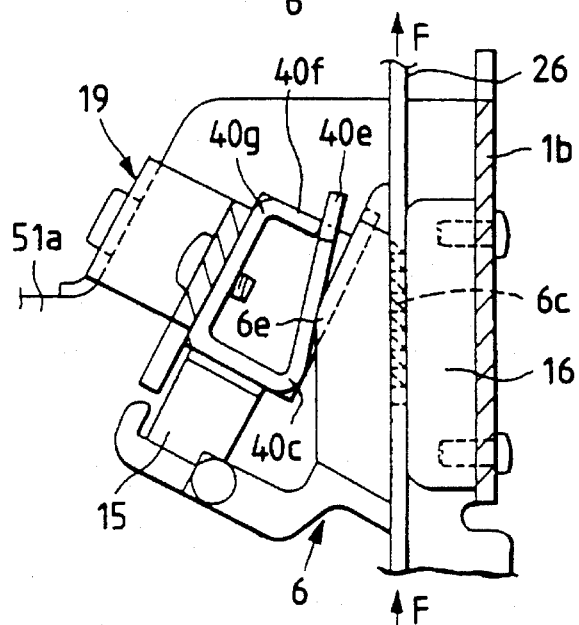

In the above clamping state, if the collision shock becomes excessively great to apply a tensile force F of a predetermined value or greater to the webbing 26, the rear end side edge 6e of the clamp 6 is going to fold the main cantilever piece 40d inwardly of the upper plate 40 and thus the force acting on the deforming portion 40c provides a load of a predetermined value or greater. Therefore, as shown in FIG. 8(b), the clamp 6 moves in the webbing draw-out direction while deforming the deforming portion 40c in such a manner that the sliding contact surface 40a becomes substantially parallel to the webbing opposing surface of the clamp 6. As a result of this, the extension tongue portion 40e of the main cantilever piece 40d folded inwardly of the upper plate 40 is abutted against the leading end portion of the sub-cantilever piece 40f.

If the tensile force F is further applied onto the webbing 26, then the main cantilever piece 40d is going to fold the sub-cantilever piece 40f inwardly of the upper plate 40, so that the clamp 6 moves in the webbing draw-out direction while it is deforming the deforming portions 40c and 40g at the same time.

Figure 8C:
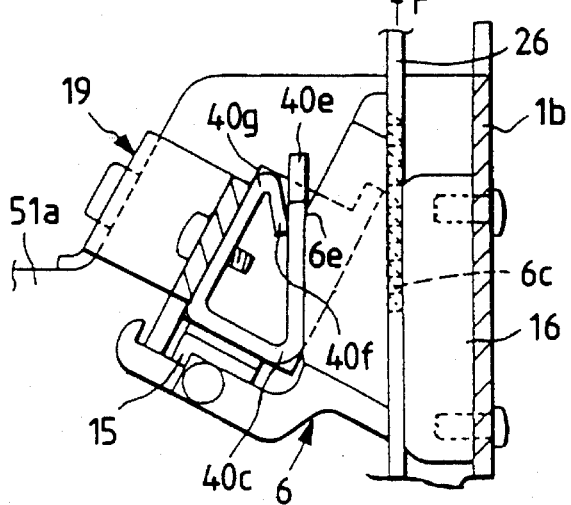

As shown in FIG. 8(c), if the deforming portions 40c and 40g are deformed until the sliding contact surface 40a becomes substantially parallel to the webbing opposing surface of the clamp 6, then the clamp 6 becomes free to move in the webbing draw-out direction to thereby remove the clamp mechanism, so that the breakage of the webbing 26 in the holding portion can be avoided.

That is, similarly to the clamp mechanism employed in the first embodiment, in the clamp mechanism used in the second embodiment, the deforming resistance to be generated when the deforming portions 40c and 40g are deformed makes it possible to consume effectively the kinetic energy of the occupant in the vehicle collision through the webbing 26 and also can prevent a sudden drop in the webbing tension when the clamp is removed.

FIG. 9 is an enlarged perspective view of the main portions of a retractor with a clamp mechanism according to a third embodiment of the present invention. In FIG. 9, there is shown an upper plate 60 which is a guide member forming a clamp mechanism of the present retractor with a clamp mechanism. In particular, the upper plate 60 is a rigid member which is provided with desired rigidity, and includes a cantilever piece 60d formed by cutting one corner portion of a hollow member with a rectangular section in the longitudinal direction thereof and projecting it with the leading end thereof as a free end, an extension tongue portion 60e provided at and extended from the leading end of the cantilever piece 60d, and a sliding contact surface 60a provided on the outer surface of the upper plate 60 for sliding contact with the plane portion 6d of the clamp 6.

The upper plate 60 is fixed to the mounting plate 19a of the upper stay 19 after the two end portions thereof are fitted into two through openings 63 formed in two mutually opposing side plates 61a respectively, whereby the upper plate 60 is fixed with such a predetermined angle of inclination that makes it possible for the upper portion of the sliding contact surface 60a, which guides the clamp 6 to the webbing clamping and engaging position, to come close to the lower plate 16 fixed to the base back plate 61b of the retractor base 61.

Also, a deforming pin 62 inserted through two through holes 64 respectively formed in the two mutually opposing side plates 61a of the retractor base 61 is extended on the upper portion of the upper plate 60, and the deforming pin 62 is positioned in the swinging range of the extension tongue portion 60e.

Next, description will be given below of the operation of the clamp mechanism according to the third embodiment of the present invention.

Figure 10A:
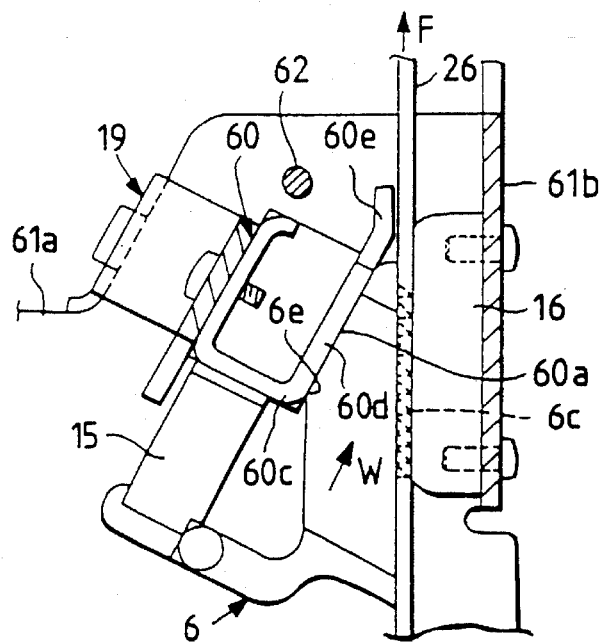
FIGS. 10(a), 10(b) and 10(c) are enlarged side views of the main portions of a clamp mechanism employed in the third embodiment, explaining the operation thereof.

At first, in an emergency such as a collision or the like, if tension is given to the webbing 26 so that a shocking rotational force of a predetermined value or greater in the webbing draw-out direction is applied onto the winding shaft 4, then as shown in FIG. 10(a), the wedge-shaped clamp 6 is moved immediately upwardly along the sliding contact surface 60a of the upper plate 60 by the clamp lever 7, slides upwardly against the energization force of the return spring 15, is moved in a webbing holding direction (in a direction of an arrow W), and bites between the sliding contact surface 60a and lower plate 16.

Figure 10B:
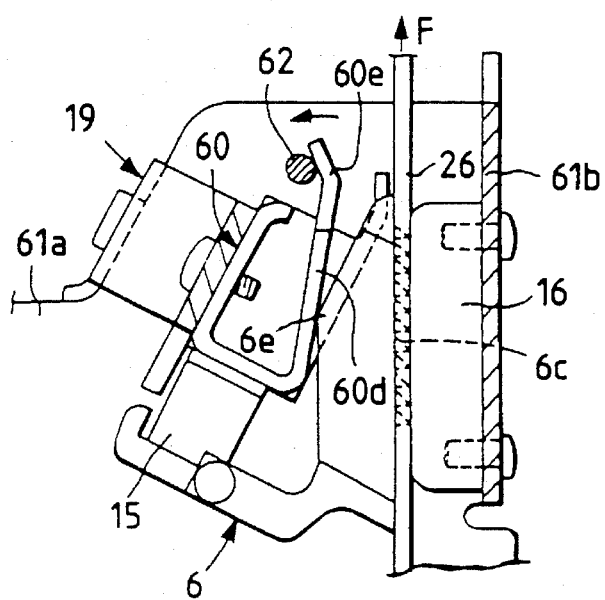

In the above-mentioned clamping condition, if the shocking force in the collision becomes excessively great and a tensile force F of a predetermined value or greater is applied onto the webbing 26, then the rear end side edge 6e of the clamp 6 is going to fold the cantilever piece 60d inwardly of the upper plate 60 and thus a force acting on the deforming portion 60c also becomes greater than a predetermined force. Therefore, as shown in FIG. 10(b), the clamp 6 moves in the webbing draw-out direction while it is deforming the deforming portion 60c in such a manner that the sliding contact surface 60a of the clamp 6 becomes substantially parallel to the webbing opposing surface of the clamp 6. As a result of this, the extension tongue portion 60e of the cantilever piece 60d folded inwardly of the upper plate 60 is abutted against the deforming pin 62.

If the tensile force F is further applied onto the webbing 26, then the cantilever piece 60d is going to fold the deforming pin 62 forwardly of the retractor and, therefore, the clamp 6 moves in the webbing draw-out direction while it is deforming the deforming portion 60c and deforming pin 62 simultaneously.

Figure 10C:
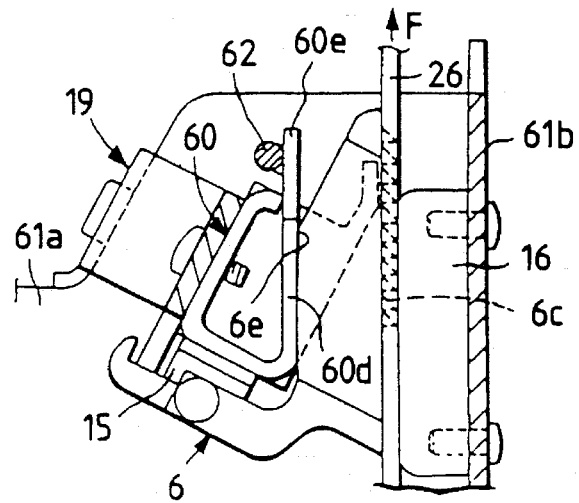

Then, as shown in FIG. 10(c), if the deforming portion 60c and deforming pin 62 are deformed until the sliding contact surface 60a becomes substantially parallel to the webbing opposing surface of the clamp 6, then the clamp 6 is free to move in the webbing draw-out direction to thereby remove the clamp mechanism, so that the breakage of the webbing 26 can be avoided in the holding portion.

Therefore, similarly to the clamp mechanisms respectively employed in the above-mentioned first and second embodiments, in the clamp mechanism employed in the third embodiment as well, the deforming resistance to be generated when the deforming portion 60c and deforming pin 62 are deformed allows the effective consumption of the kinetic energy of the occupant in the vehicle collision through the webbing 26 and also can prevent a sudden drop in the webbing tension in the clamp removal time.

Further, describing a relationship between the webbing tensile force F and the clamp movement amount S of the clamp in the webbing draw-out direction in the second and third embodiments with reference to FIG. 11, the webbing tensile force F acting on the webbing 26 when the clamp removal mechanisms in the second and third embodiments are in operation shows a tendency to decrease from the point 0 where the removal of the webbing holding starts to the point P where the deformation of the second deforming portion, that is, the deforming portion 40g or deforming pin 62 starts, substantially similarly to the operation of the clamp removal mechanism according to the first embodiment.

Because the deformation of the deforming portion 40g or deforming pin 62 starts at the point P, as shown by a one-dot chained line in FIG. 11, the clamp movement amount S increases while a proper webbing tensile force F is being maintained, until the deformation of the deforming portion 40 or deforming pin 62 is completed at a point R.

Therefore, when compared with the clamp mechanism according to the first embodiment, in the clamp mechanisms according to the second and third embodiments, the webbing tensile force and clamp movement amount when the clamp 6 in the clamping condition moves in the webbing draw-out direction can be controlled more finely and thus the freedom of design can be improved.

Here, the shapes of the guide members as well as the position and number of the deforming portions in the guide members employed in the first, second and third embodiments of the present invention are not limiting but, according to the present invention, various changes are possible.

Figure 12:
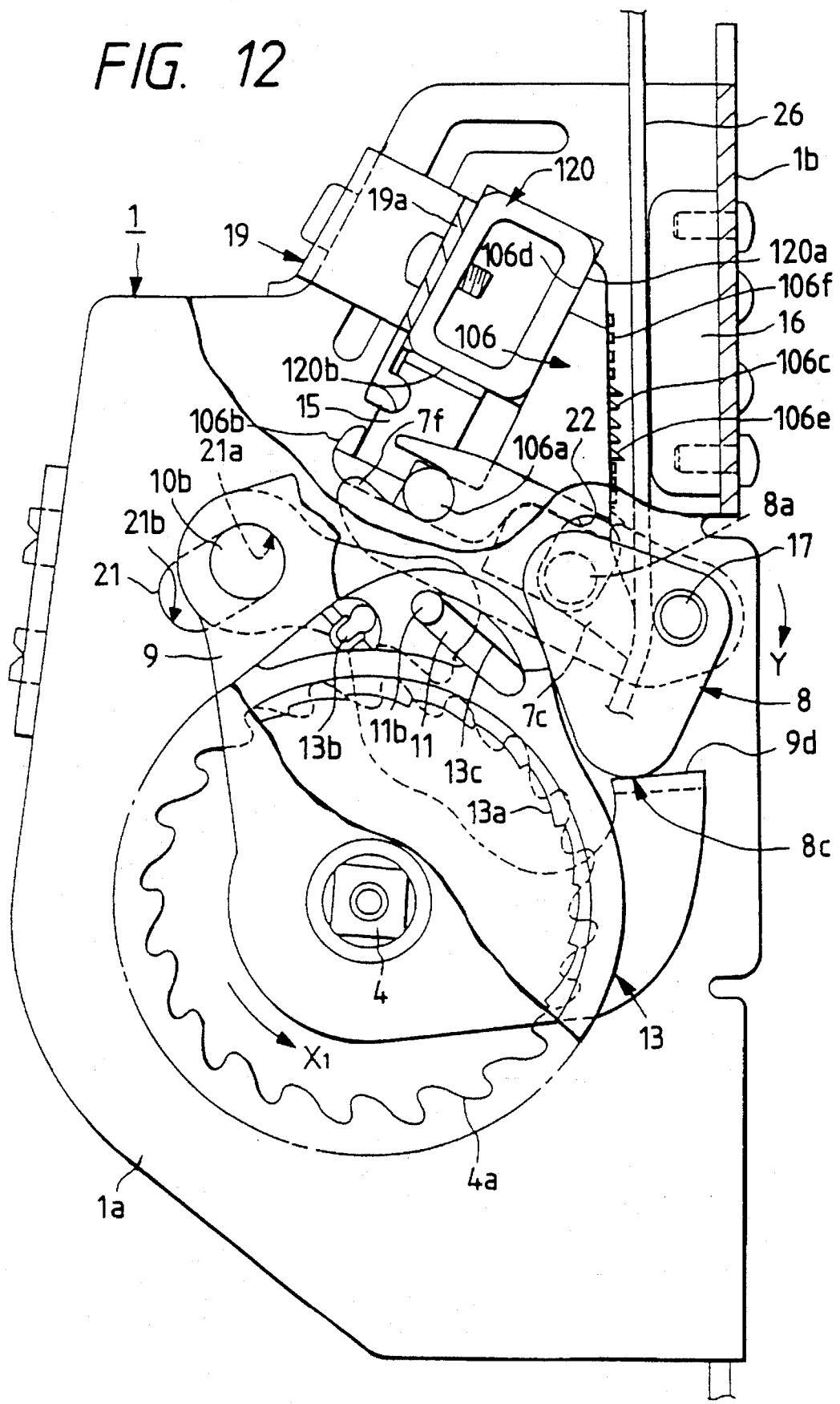
FIG. 12 is a partially broken side view of a retractor including a clamp mechanism according to a fourth embodiment of the present invention.
Figure 13:
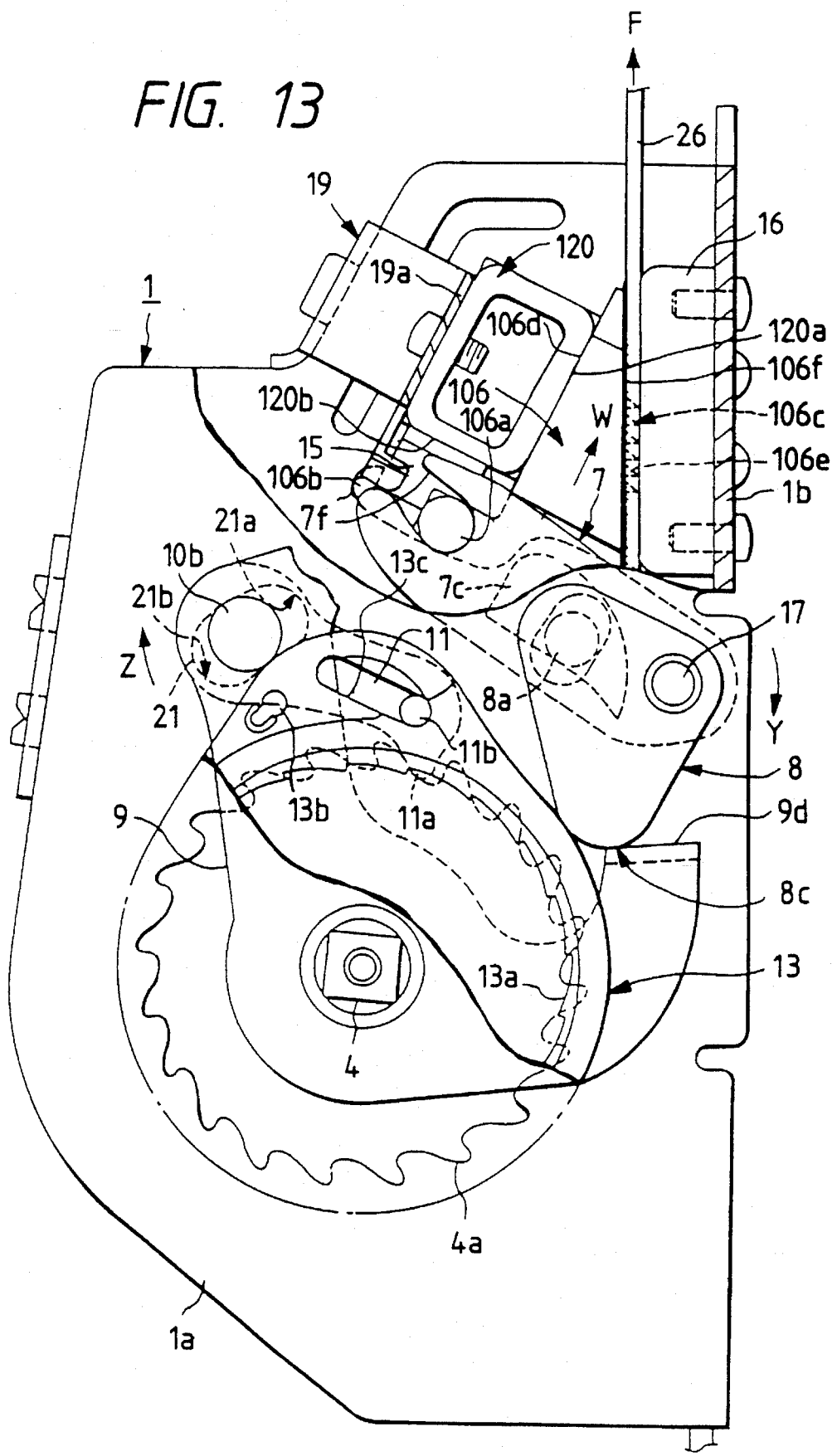
FIG. 13 is a partially broken side view of a retractor including a clamp mechanism according to a fourth embodiment of the present invention in the web clamping position.

Now, FIGS. 12 and 13 are respectively a partially broken side view of a retractor with a clamp mechanism according to a fourth embodiment of the present invention. In the fourth embodiment, similar parts to those in the first embodiment are used and the detailed description thereof is omitted here. A clamp mechanism according to the fourth embodiment provides a clamp 106 consisting of a wedge-shaped clamp member which includes in the webbing opposing surface thereof a hold portion 106c having increased frictional resistance for clamping and engaging a webbing 26, and an upper stay 19 holding an upper plate 120 consisting of a guide member which is slidingly contactable with a plane portion 106d of the clamp 106 situated on the opposite side to the webbing opposing surface of the clamp 106 having the hold portion 106c therein.

Figure 14:
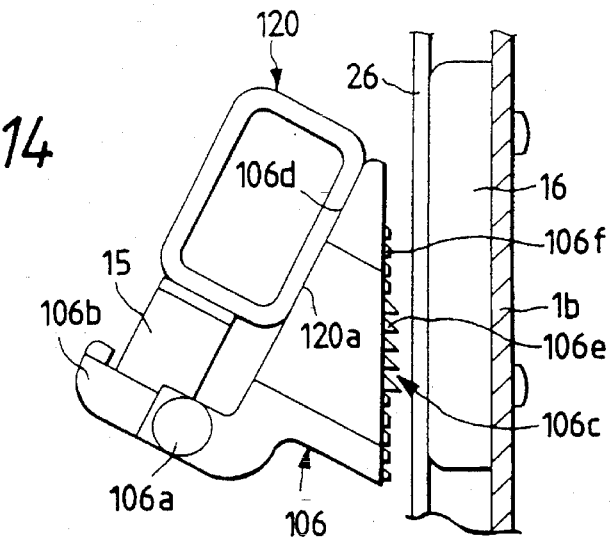
FIG. 14 is an enlarged side view of the main portions of a clamp mechanism shown in FIG. 12.

The hold portion 106c of the clamp 106, as shown in FIG. 14, is formed in such a shape as capable of biting into the webbing surface, and includes a clamp teeth portion 106e which can be sheared by a tensile force F of a predetermined value or greater acting on the webbing 26, and a pressure teeth portion 106f which can apply resistance to the webbing 26 movable in the webbing draw-out direction by the tensile force F of a predetermined value or greater. The clamp teeth portion 106e is formed in a sharp pyramid shape easy to bite into the webbing surface and, at the same time, it is arranged such that it can be sheared or deformed if a shearing force of an allowed value or greater is applied thereto. Also, the pressure teeth portion 106f is formed in a truncated pyramid shape so that it is more difficult to bite into the webbing surface than the clamp teeth portion 106e.

Accordingly, when the tensile force F acting on the webbing 26 during the webbing holding time is smaller than a predetermined value, then the clamp teeth portion 106e cannot be sheared or deformed but can bite into the webbing surface to prevent the extension of a seat belt completely. And, if the tensile force F acting on the webbing 26 is equal to or greater than a predetermined value, the clamp teeth portion 106e is partly sheared or deformed to thereby remove the webbing holding force given by the clamp teeth portion 106e. Also, although the pressure teeth portion 106f cannot bite into the webbing surface to prevent the extension of the seat belt, it presses against the webbing surface to thereby be able to give a resisting force to the webbing 26 moving in the webbing drawout direction by a tensile force F of a predetermined value or greater.

Next, description will be given of the operation of the clamp mechanism according to the fourth embodiment.

At first, in an emergency such as a collision or the like, if tension is given to the webbing 26 so that a shocking rotational force in the webbing draw-out direction is applied to the winding shaft 4, then the clamp 106 supported in a notch 7f formed on the swinging end side of the clamp lever 7 is immediately moved upwardly along the sliding contact surface 120a of the upper plate 120. Since the sliding contact surface 120a is inclined such that the upper portion thereof comes close to the lower plate 16, the wedge-shaped clamp 106 slid upwardly against the energization force of the return spring 15 moves in the webbing hold direction (in a direction of an arrow W) and bites into between the sliding contact surface 120a and lower plate 16.

Figure 15A:
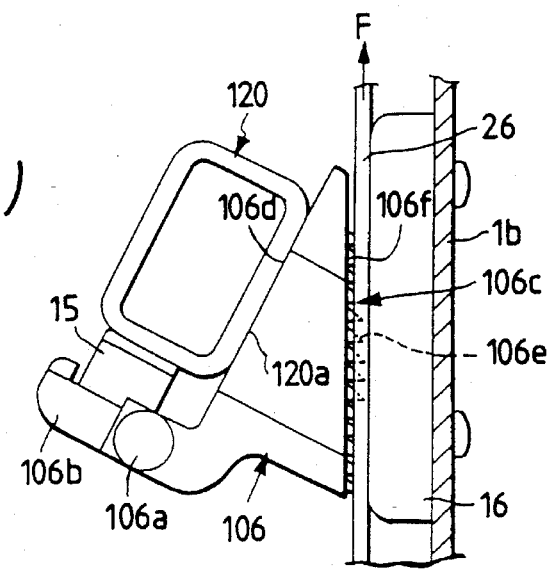
FIGS. 15(a) and 15(b) are enlarged side views of the main portions of the clamp mechanism shown in FIG. 14, explaining the operation thereof.

As a result of this, the holding portion 106c of the clamp 106, as shown in FIG. 15(a), holds the webbing 26 while allowing the clamp teeth portion 106e to bite into the webbing surface and, therefore, the webbing 26 is held by and between the clamp 106 and lower plate 16 and is thus prevented from to being drawn out.

In the above clamped condition, if the collision shock becomes large excessively and a tensile force F on the webbing 26 is increased further, then a tensile force F of a predetermined value or greater is applied onto the webbing 26 and thereby a shearing force of an allowed value or greater is applied onto the clamp teeth portion 106e, so that the clamp teeth portion 106e is in part sheared or deformed to thereby remove the webbing holding force given by the clamp teeth portion 106e.

Figure 15B:
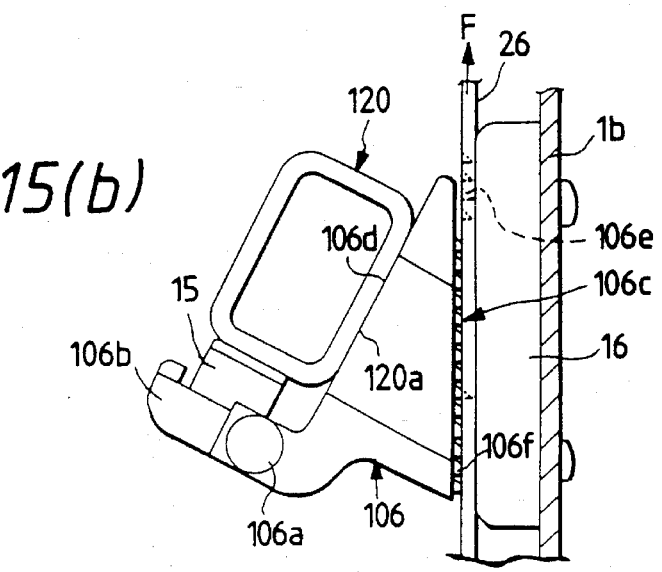

As a result of this, the webbing 26, which is now free from the webbing holding force by the clamp teeth portion 106e, is prevented from being broken in the holding portion and, as shown in FIG. 15(b), moves in the webbing draw-out direction. During this, since the webbing 26 is given a resisting force by the pressure teeth portion 106f and the remaining portion of the clamp teeth, the kinetic energy of the occupant in the vehicle collision can be consumed effectively to thereby prevent a sudden drop in the webbing tension during the clamp removal time. Also, even when the webbing holding force by the clamp mechanism is removed, the webbing 26 is prevented from being drawn out by the emergency lock mechanism through the winding shaft 4.

Also, by changing the distribution of the clamp teeth portion 106e and pressure teeth portion 106f in the hold portion 106c, the forming positions thereof and the shapes of the teeth thereof according to cases, the allowed shearing force of the clamp teeth portion 106e, the pressure of the pressure teeth portion 106f and the like can be changed simply, which in turn makes it possible to control the webbing tension in the clamped condition and the clamp removing load by the clamp 106 more finely and thus to improve the freedom of design of the retractor.

The shapes, arrangement and teeth shapes of the clamp teeth portion and pressure teeth portion according to the fourth embodiment of the present invention are not limited to the illustrated ones but various changes and modifications are possible.

Also, the structure of the clamp mechanism and the shape of the clamp member according to the fourth embodiment of the present invention are not limited to the illustrated ones but various changes and modifications are possible. That is, they can also be applied to other various types of retractors having various types of clamp mechanisms, such as a clamp mechanism in which a webbing is held by a rotational hold member with one end portion thereof supported rotatably.

Further, the present invention can also be applied to a retractor with a clamp mechanism which includes an emergency lock mechanism using other inertia sensing device and lock device different from the structure of the above-mentioned emergency lock mechanism employed in the illustrated embodiments.

As described above, in accordance with to the retractor with the clamp mechanism according to the present invention, in the vehicle emergency, if the tensile force of the predetermined value or greater is applied onto the webbing, then the clamp member moves in the webbing draw-out direction while it is deforming the deforming portion of the guide member in such a manner that the sliding contact surface of the guide member becomes substantially parallel to the webbing opposing surface of the clamp member, thereby removing the clamp mechanism, so that the kinetic energy of the occupant can be consumed effectively in the process where the deforming portion is deformed to thereby prevent the sudden drop in the webbing tension during the clamp removal time.

Also, since the clamp mechanism can be removed simply by deforming the deforming portion of the guide member in such a manner that the sliding contact surface of the guide member becomes substantially parallel to the webbing opposing surface of the clamp member, there is no need to expand the vehicle body space for storing the present retractor.

Therefore, the present invention can provide the retractor including the good clamp removal mechanism which can be mounted on the vehicle conveniently and also can efficiently absorb kinetic energy produced in the occupant in the vehicle collision.

Further, in accordance with to the retractor with the clamp mechanism according to the present invention, in the vehicle emergency, if the tensile force of the predetermined value or greater is applied onto the webbing, then the clamp teeth portion of the clamp member is partly sheared or deformed to thereby remove the webbing holding force given by the portion of the clamp teeth portion existing in the hold portion, so that the webbing moves in the webbing draw-out direction. However, since the pressure by the pressure teeth portion in the hold portion as well as the sliding resistance between the remaining portion of the clamp teeth portion and the webbing are applied onto the webbing, the webbing holding force by the clamp member will not be removed at the stretch but the webbing moving in the webbing draw-out direction is given the resistances that are produced by the pressure teeth portion and the remaining portion of the clamp teeth portion.

Therefore, the kinetic energy of the occupant can be consumed effectively due to the resistances by the pressure teeth portion and the remaining portion of the clamp teeth portion to thereby be able to prevent the sudden drop in the webbing tension during the clamp removal time. Also, by changing the distribution of the clamp teeth portion and pressure teeth portion in the hold portion and the shapes of the teeth thereof, the clamp removal load can be controlled easily.

That is, according to the present invention, there can be provided the retractor including the good clamp removal mechanism which can absorb efficiently the kinetic energy produced in the body of the occupant in the vehicle collision.

What is claimed is:

1. A retractor including a clamp mechanism for holding a webbing directly in a vehicle emergency, comprising:

a retractor base;

a lower plate fixed to said retractor base;

a movable clamp member for holding a webbing between said lower plate and said clamp member.; and a guide member for guiding said clamp member to a webbing holding position, wherein said clamp member includes a clamp teeth portion for clamping and engaging said webbing with a webbing opposing surface of said clamp member, a plane portion located On an opposite side to said webbing opposing surface, and a rear end side edge on a rear end side of said plane portion, wherein said guide member includes a sliding contact surface for sliding contact with said plane portion of said clamp member and a deforming portion deformable substantially in parallel to said webbing opposing surface of said clamp member, wherein said deforming portion of said guide member is structured so that said deforming portion is deformed by said rear end side edge of said clamp member, if a tensile force of a predetermined value or greater is applied to said webbing, in accordance with the movement of said clamp member in a webbing draw-out direction.

2. A retractor including a clamp mechanism for holding a webbing directly in a vehicle emergency, comprising:

a retractor base;

a lower plate fixed to said retractor base;

a movable clamp member for holding a webbing between said lower plate and said clamp member; and a guide member for guiding said clamp member to a webbing holding position, wherein said clamp member includes a clamp teeth portion for clamping and engaging said webbing with a webbing opposing surface of said clamp member, a plane portion located on an opposite side to said webbing opposing surface, and a rear end side edge on a rear end side of said plane portion, wherein said guide member includes a sliding contact surface for sliding contact with said plane portion of said clamp member and a deforming portion deformable substantially in parallel to said webbing opposing surface of said clamp member, wherein said guide member includes:

a main cantilever piece having a leading end thereof projected as a free end;

an extension tongue portion formed in the leading end of said main cantilever piece;

a sub-cantilever piece opposed to said extension tongue portion;

a first deforming portion located on a base end side of said main cantilever piece; and a second deforming portion located on a base end side of said sub-cantilever piece;

wherein said guide member is structured so that, if a tensile force of a predetermined value or greater is applied to said webbing, said first deforming portion is deformed by said rear end side edge of said clamp member in accordance with the movement of said clamp member in a webbing draw-out direction, and said second deforming portion is deformed by said main cantilever piece folded by the deformation of said first deforming portion.

3. A retractor including a clamp mechanism for holding a webbing directly in a vehicle emergency, comprising:

a retractor base;

a deforming pin inserted through said retractor base;

a lower plate fixed to said retractor base;

a movable clamp member for holding a webbing between said lower plate and said clamp member; and a guide member for guiding said clamp member to a webbing holding position, wherein said clamp .member includes a clamp teeth portion for clamping and engaging said webbing with a webbing opposing surface of said clamp member, a plane portion located on an opposite side to said webbing opposing surface, and a rear end side edge on a rear end side of said plane portion, wherein said guide member includes a sliding contact surface for sliding contact with said plane portion of said clamp member and a deforming portion deformable substantially in parallel to said webbing opposing surface of said clamp member, wherein said guide member includes a cantilever piece having a leading end thereof projected as a free end and an extension tongue piece formed in the leading end of said cantilever piece, and wherein said guide member is structured so that, if a tensile force of a predetermined value or greater is applied to said webbing, the deforming portion of said guide member is deformed by said rear end side edge in accordance with the movement of said clamp member in a webbing draw-out direction, and said deforming pin is deformed by said extension tongue piece of said cantilever piece folded by the deformation of said deforming portion.

4. A retractor including a clamp mechanism for holding a webbing directly to prevent the webbing from being drawn out in a vehicle emergency, comprising:

a retractor base;

a winding shaft supported rotatably on said retractor base for winding a webbing thereround;

a ratchet plate mounted on said winding shaft;

a pawl member engageable with said ratchet plate for locking the rotation of said winding shaft in a webbing draw-out direction thereof;

a lower plate fixed to said retractor base;

a movable clamp member for holding said webbing between said lower plate and said clamp member;

a guide member for guiding said clamp member to a webbing holding position;

an emergency lock mechanism for locking the rotation of said winding shaft in the webbing draw-out direction; and a lever member for moving said clamp member in a webbing holding direction coupled to said emergency lock mechanism, wherein said clamp member includes a clamp teeth portion for clamping and engaging said webbing with a webbing opposing surface of said clamp member, a plane portion located on an opposite side to said webbing opposing surface, and a rear end side edge on a rear end side of said plane portion, wherein said guide member is formed of a hollow member having a rectangular section, said guide member including a sliding contact surface for sliding contact with said plane portion of said clamp member and a deforming portion deformable substantially in parallel to said webbing opposing surface of said clamp member, wherein said deforming portion of said guide member is structured so that said deforming portion is deformed by said rear end side edge of said clamp member, if a tensile force of a predetermined value or greater is applied to said webbing, in accordance with the movement of said clamp member in a webbing draw-out direction.

5. The retractor of claim 4, wherein said emergency lock mechanism includes:

an inertia member rotatably following said winding shaft;

a ratchet member rotatable together with said winding shaft in the webbing draw-out direction to engage said pawl member with said ratchet plate for locking the rotation of said winding shaft in the webbing draw-out direction; and lock means for connecting said ratchet member with said winding shaft in accordance with a rotational delay of said inertia member with respect to said winding shaft.

6. A retractor including a clamp mechanism for holding a webbing directly to prevent the webbing from being drawn out in a vehicle emergency, comprising:

a retractor base;

a winding shaft supported rotatably on said retractor base for winding a webbing thereround;

a ratchet plate mounted on said winding shaft:

a pawl member engageable with said ratchet plate for locking the rotation of said winding shaft in a webbing draw-out direction thereof;

a lower plate fixed to said retractor base;

a movable clamp member for holding said webbing between said lower plate and said clamp member;

a guide member for guiding said clamp member to a webbing holding position;

an emergency lock mechanism for locking the rotation of said winding shaft in the webbing draw-out direction; and a lever member for moving said clamp member in a webbing holding direction in linking with said emergency lock mechanism, wherein said clamp member includes a clamp teeth portion for clamping and engaging said webbing with a webbing opposing surface of said clamp member, a plane portion located on an opposite side to said webbing opposing surface, and a rear end side edge on a rear end side of said plane portion, wherein said guide member is formed of a hollow member having a rectangular section, said guide member including a sliding contact surface for sliding contact with said plane portion of said clamp member end a deforming portion deformable substantially in parallel to said webbing opposing surface of said clamp member, wherein said guide member includes:

a main cantilever piece having a leading end thereof projected as a free end;

an extension tongue portion formed in the leading end of said main cantilever piece;

a sub-cantilever piece opposed to said extension tongue portion;

a first deforming portion located on a base end side of said main cantilever piece; and a second deforming portion located on a base end side of said sub-cantilever piece;

wherein said guide member is structured so that, if a tensile force of a predetermined value or greater is applied to said webbing, said first deforming portion is deformed by said rear end side edge of said clamp member in accordance with the movement of said clamp member in a webbing draw-out direction, and said second deforming portion is deformed by said main cantilever piece folded by the deformation of said first deforming portion.

7. A retractor including a clamp mechanism for holding a webbing directly to prevent the webbing from being drawn out in a vehicle emergency, comprising;

a retractor base;

a deforming pin inserted through said retractor base;

a winding shaft supported rotatably on said retractor base for winding a webbing thereround;

a ratchet plate mounted on said winding shaft;

a pawl member engageable with said ratchet plate for locking the rotation of said winding shaft in a webbing draw-out direction thereof;

a lower plate fixed to said retractor base:

a movable clamp member for holding said webbing between said lower plate and said clamp member;

a guide member for guiding said clamp member to a webbing holding position;

an emergency lock mechanism for locking the rotation of said winding shaft in the webbing draw-out direction; and a lever member for moving said clamp member in a webbing holding direction in linking with said emergency lock mechanism, wherein said clamp member includes a clamp teeth portion for clamping and engaging said webbing with a webbing opposing surface of said clamp member, a plane portion located on an opposite side to said webbing opposing surface, and a rear end side edge on a rear end side of said plane portion, wherein said guide member is formed of a hollow member having a rectangular section, said guide member including a sliding contact surface for sliding contact with said plane portion of said clamp member and a deforming portion deformable substantially in parallel to said webbing opposing surface of said clamp member, and said guide member includes a main cantilever piece having a leading end thereof projected as a free end and an extension tongue portion formed in the leading end of said main cantilever piece, and wherein said guide member is structured so that, if a tensile force of a predetermined value or greater is applied to said webbing, the deforming portion of said guide member is deformed by said rear end side edge in accordance with the movement of said clamp member in a webbing draw-out direction, and said deforming pin in deformed by said extension tongue piece of said cantilever piece folded by the deformation of said deforming portion.

8. A retractor including a clamp mechanism for holding a webbing directly in a vehicle emergency, comprising:

a retractor base;

a winding shaft supported rotatably on said retractor base for winding a webbing thereround;

a ratchet plate mounted on said winding shaft;

a pawl member engageable with said ratchet plate for locking the rotation of said winding shaft in a webbing draw-out direction;

a lower plate fixed to said retractor base; and a movable wedge-shaped clamp member for holding said webbing between said lower plate and said clamp member, wherein said clamp member includes a hold portion for clamping and engaging said webbing, and said hold portion including a clamp teeth portion formed in a shape capable of biting into a surface of said webbing and shearable and deformable by a tensile force of a predetermined value or greater, and said clamp member includes a pressure teeth portion capable of applying resistance to said webbing moved in the webbing draw-out direction by a tensile force of a predetermined value or greater.

9. The retractor of claim 8, further comprising an emergency lock mechanism for locking the rotation of said winding shaft in the webbing draw-out direction in a vehicle emergency, a guide member for guiding said clamp member to a webbing holding position, and lever members for moving said clamp member in the webbing holding direction in linking with said emergency lock mechanism.

* * * * *